United States Patent
Wise

(10) Patent No.: US 11,027,413 B2
(45) Date of Patent: *Jun. 8, 2021

(54) COLLAPSIBLE INFEED/OUTFEED APPARATUS WITH SHELF

(71) Applicant: Robert Wise, Penngrove, CA (US)

(72) Inventor: Robert Wise, Penngrove, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/676,853

(22) Filed: Nov. 7, 2019

(65) Prior Publication Data

US 2020/0298390 A1 Sep. 24, 2020

Related U.S. Application Data

(63) Continuation-in-part of application No. 16/360,109, filed on Mar. 21, 2019.

(51) Int. Cl.
*B25H 1/04* (2006.01)
*B23D 47/02* (2006.01)

(52) U.S. Cl.
CPC .............. *B25H 1/04* (2013.01); *B23D 47/025* (2013.01)

(58) Field of Classification Search
CPC .... B25H 1/00; B25H 1/04; A47B 5/00; A47B 3/00; A47B 3/02; A47B 3/087; A47B 2003/045; A47B 2003/08358; A47B 2200/0012; A47B 2003/0835; B62B 1/12
USPC ... 108/35, 118, 38, 120, 123, 124, 128, 117, 108/36, 41, 40, 115; 211/198
See application file for complete search history.

(56) References Cited

U.S. PATENT DOCUMENTS

| | | | |
|---|---|---|---|
| 1,062,996 A | 5/1913 | Somberger | |
| 1,115,731 A | * 11/1914 | Owens | A47B 3/087 108/35 |
| 1,178,597 A | 4/1916 | Owens | |
| 1,272,560 A | 7/1918 | Stone | |
| 1,378,178 A | 5/1921 | Korn | |
| 1,585,569 A | 5/1926 | Stine | |
| 1,601,250 A | 9/1926 | Hilderbrand | |
| 1,762,580 A | 6/1930 | William | |
| 1,838,095 A | 12/1931 | John | |
| 2,015,560 A | 9/1935 | Carlo | |
| 2,324,684 A | 7/1943 | Dietz | |
| 2,544,220 A | 3/1951 | Concklin | |

(Continued)

OTHER PUBLICATIONS

QuickBENCH—Portable Workbench—Oct. 2016.
Worx—Pegasus—Oct. 1, 2016.

*Primary Examiner* — Jose V Chen
(74) *Attorney, Agent, or Firm* — Boudwin Intellectual Property; Daniel Boudwin

(57) ABSTRACT

A truss designed folding Apparatus. The apparatus may be constructed of a first apparatus top section and a second apparatus top section which may be pivotally connected together by a center support structure. The apparatus may have two sets of legs. A first set of legs may be movably attached to the center support structure and a second set of legs may also be movably attached to the center support structure. Each set of legs may also be attached to the apparatus top via a first and a second leg support extending from the legs to the apparatus top sections. A shelf connection may be placed between the first and second leg support wherein, a shelf attached to each pair of legs the shelf may have a first section and second section, wherein the sections are attached to each other at opposite ends of the shelf connection.

19 Claims, 22 Drawing Sheets

(56) References Cited

U.S. PATENT DOCUMENTS

| | | | |
|---|---|---|---|
| 2,747,956 A | 5/1956 | Saul | |
| 2,759,576 A | 8/1956 | Townsend | |
| 2,784,004 A | 3/1957 | Hamrick | |
| 2,831,741 A * | 4/1958 | Wilson | A47B 3/087 108/169 |
| 3,147,748 A | 9/1964 | Frank | |
| 3,148,639 A * | 9/1964 | Nadal | D06F 81/04 108/169 |
| 3,158,112 A * | 11/1964 | Smith | D06F 81/02 108/36 |
| 3,214,217 A | 10/1965 | Jente | |
| 3,279,399 A | 10/1966 | White | |
| 3,641,947 A | 2/1972 | Finney | |
| 3,669,031 A * | 6/1972 | Cole | A47B 3/00 108/102 |
| 3,989,295 A | 11/1976 | Sparkes | |
| 4,230,329 A | 10/1980 | Johnson | |
| 4,248,115 A | 2/1981 | Brodbeck et al. | |
| 4,249,636 A | 2/1981 | Jackson et al. | |
| 4,269,095 A | 5/1981 | Lundberg | |
| 4,284,286 A * | 8/1981 | Lewallen | B62B 1/002 280/30 |
| 4,377,099 A | 3/1983 | Howe | |
| 4,388,796 A | 6/1983 | Zelnick | |
| 4,452,118 A | 6/1984 | Muller | |
| 4,538,655 A | 9/1985 | Berkeley | |
| 4,565,382 A | 1/1986 | Sherman | |
| 4,643,103 A * | 2/1987 | Jorgensen | A47B 3/087 108/128 |
| 4,763,757 A | 8/1988 | Cheney | |
| 4,817,693 A | 4/1989 | Schuler | |
| 4,830,076 A | 5/1989 | Feyer | |
| 4,852,623 A | 8/1989 | Rodrigues | |
| 4,874,025 A | 10/1989 | Cleveland | |
| 4,884,604 A | 12/1989 | Rice et al. | |
| 4,934,718 A | 6/1990 | Voegele | |
| 4,955,941 A | 9/1990 | Rousseau | |
| 4,974,651 A | 12/1990 | Carmon et al. | |
| 4,998,697 A | 3/1991 | Esposito | |
| 5,016,358 A | 5/1991 | Rice et al. | |
| 5,154,441 A | 10/1992 | White et al. | |
| 5,161,590 A | 11/1992 | Otto | |
| 5,199,930 A * | 4/1993 | Weber | A63K 3/043 108/117 |
| 5,247,976 A | 9/1993 | Matthews | |
| 5,255,724 A | 10/1993 | Butke | |
| 5,320,150 A | 6/1994 | Everts et al. | |
| 5,383,977 A | 1/1995 | Pearce | |
| 5,501,158 A | 3/1996 | Cheney | |
| 5,526,897 A | 6/1996 | Schiller | |
| 5,536,034 A | 7/1996 | Miller | |
| 5,542,639 A * | 8/1996 | Wixey | B23D 47/025 108/117 |
| 5,595,227 A | 1/1997 | Varley | |
| 5,642,898 A | 7/1997 | Wise | |
| 5,779,523 A | 7/1998 | Mesher | |
| 5,819,622 A | 10/1998 | Quick | |
| 5,857,507 A | 1/1999 | Puzio et al. | |
| 5,863,052 A | 1/1999 | Roman | |
| 5,865,269 A | 2/1999 | Eskesen | |
| 5,884,681 A | 3/1999 | Nickles | |
| 5,927,745 A * | 7/1999 | Cunningham | A47B 31/04 108/118 |
| 5,957,472 A | 9/1999 | Borgatti | |
| 6,047,750 A | 4/2000 | Jensen | |
| 6,062,280 A | 5/2000 | Newnes et al. | |
| 6,131,629 A | 10/2000 | Puzio et al. | |
| 6,199,463 B1 | 3/2001 | Quick | |
| 6,212,983 B1 | 4/2001 | Pyle | |
| 6,286,824 B1 * | 9/2001 | Sagol | B25H 1/04 269/900 |
| 6,328,319 B1 | 12/2001 | Stahler | |
| 6,345,829 B1 | 2/2002 | Mueller | |
| 6,364,328 B1 | 4/2002 | Stahler | |
| 6,397,713 B1 | 6/2002 | Quick | |
| 6,530,583 B1 | 3/2003 | Mueller | |
| 6,578,461 B1 | 6/2003 | Loo | |
| 6,578,856 B2 | 6/2003 | Kahle | |
| 6,581,656 B1 | 6/2003 | Harper | |
| 6,698,364 B2 * | 3/2004 | Welch | A47F 5/137 108/115 |
| 6,708,593 B1 | 3/2004 | Weselyk | |
| D491,709 S | 6/2004 | Wise | |
| 6,874,427 B2 * | 4/2005 | Izumi | A47B 3/04 108/34 |
| 6,886,836 B1 | 5/2005 | Wise | |
| 6,899,004 B1 | 5/2005 | Miller | |
| 6,942,085 B1 | 9/2005 | Tatz | |
| D535,491 S | 1/2007 | Wise | |
| D546,017 S | 7/2007 | Wise | |
| 7,337,731 B2 * | 3/2008 | Mu | A47B 3/00 108/132 |
| 7,415,933 B2 | 8/2008 | Sagol | |
| D577,507 S * | 9/2008 | Collins | D6/684 |
| D584,421 S | 1/2009 | Wise | |
| 7,543,614 B2 * | 6/2009 | Wise | B25H 1/04 108/36 |
| D598,622 S | 8/2009 | Wise | |
| D608,969 S | 1/2010 | Wise | |
| 7,971,898 B2 | 7/2011 | Wise | |
| 8,408,145 B2 * | 4/2013 | Chen | A47B 1/04 108/128 |
| D709,626 S | 7/2014 | Wise | |
| 8,939,415 B2 * | 1/2015 | Dillinger | E04G 3/265 248/237 |
| 10,124,479 B2 * | 11/2018 | Reinhart | B25H 1/06 |
| D842,015 S * | 3/2019 | Strempke | D6/684 |
| 2001/0047712 A1 | 12/2001 | Kahle | |
| 2002/0125072 A1 * | 9/2002 | Levy | B25H 1/06 182/153 |
| 2002/0125662 A1 | 9/2002 | Magness | |
| 2002/0157731 A1 | 10/2002 | Harper | |
| 2004/0250903 A1 | 12/2004 | Welsh | |
| 2005/0034783 A1 | 2/2005 | Laird | |
| 2005/0087049 A1 | 4/2005 | Miller et al. | |
| 2005/0230188 A1 * | 10/2005 | Berg | B25H 1/06 182/153 |
| 2006/0021550 A1 | 2/2006 | Sagol | |
| 2006/0118012 A1 * | 6/2006 | Katz | A47B 3/08 108/129 |
| 2007/0056797 A1 * | 3/2007 | Wang | E06C 1/397 182/21 |
| 2008/0053284 A1 | 3/2008 | Miller et al. | |
| 2008/0210336 A1 | 9/2008 | Balolia | |
| 2008/0229596 A1 | 9/2008 | Balolia | |
| 2008/0282941 A1 | 11/2008 | Wise | |
| 2009/0283021 A1 * | 11/2009 | Wong | B25H 1/18 108/116 |
| 2009/0288914 A1 * | 11/2009 | Landau | B25H 1/06 182/225 |
| 2013/0088053 A1 * | 4/2013 | Chen | A47B 3/083 297/16.2 |
| 2013/0140110 A1 * | 6/2013 | Ken-Dror | E04G 1/32 182/18 |
| 2018/0099403 A1 * | 4/2018 | Reinhart | B25H 1/0042 |
| 2019/0045919 A1 * | 2/2019 | Boyer | A47B 3/087 |

\* cited by examiner

COLLAPSIBLE INFEED/OUTFEED APPARATUS WITH SHELF

CROSS REFERENCE TO RELATED APPLICATIONS

This application claims the benefit of U.S. application Ser. No. 16/360,109 filed on Mar. 21, 2019. The above identified patent application is herein incorporated by reference in its entirety to provide continuity of disclosure.

TECHNICAL FIELD

The invention relates to collapsible workbenches. More specifically, the invention relates to collapsible work apparatus, infeed/outfeed apparatus, and mobile stands for power tools.

BACKGROUND OF THE INVENTION

Portable, wheeled tool carts have been available for some time. One such prior art tool cart is shown and described by Wise, the inventor herein, in U.S. Pat. No. 5,642,898, issued Jul. 1, 1997. Additional tool carts have been described in the patent literature. For instance, U.S. Pat. No. 4,955,941, issued Sep. 11, 1990, to Rousseau, describes a support apparatus for a bench saw. U.S. Pat. No. 4,230,329, issued Oct. 28, 1980 to Johnson, describes a mobile cart. U.S. Pat. No. 5,161,590, issued Nov. 10, 1992, to Otto, describes a miter saw apparatus. U.S. Pat. No. 5,255,724, issued Oct. 26, 1993, to Butke, describes an adjustable extension assembly. A brochure showing the Rousseau SS2850 product discloses a mobile miter saw stand.

U.S. Design Pat. No. D535,491 issued Jan. 23, 2007 to the inventor herein entitled "Convertible Work Bench", discloses a collapsible work apparatus that is adjustable for supporting a powered saw such as a miter saw, chop saw, or other crosscut type of saw. That work bench includes adjustable infeed and outfeed bars for supporting an elongated workpiece to be crosscut. The inventor herein has further been issued U.S. Pat. No. 6,886,836 on May 3, 2005 titled "Counterbalanced Universal Mobile Saw Stand" that is particularly well adapted for supporting a powered crosscut saw in both an elevated position for working at standing height, and a collapsed position for working adjacent the floor, such as when mitering floor moldings for carpentry. The disclosed device is also well adapted for transporting a powered saw, such as a chop saw or the like to and from a work site. Thus, the above prior art discloses a wide range of configurations for infeed/outfeed apparatus, collapsible saw support stands, collapsible work apparatus, and portable infeed/outfeed apparatus. Further, those of ordinary skill in the art are aware of clamp-like devices supporting elongated rollers that may be attached to conventional sawhorses for use as infeed/outfeed supports for materials to be crosscut. It is also known that sawhorses may be of the collapsible, reusable type.

Mr. James Warren has a patent for a bridge that dates back to 1848. Mr. Warren's truss design was a solid straight bar supported by a plurality if of triangle structures located above the bar. The triangles allowed for some of the triangles to have tension applied and other to have pressure applied. The truss system allows for loads to in fact make the truss stronger. This truss design however has never been foldable.

Nevertheless, none of the above prior art devices are well adapted for performing all of these functions in a single, lightweight device.

Thus, a need exists for a collapsible work stand that can also serve as an infeed/outfeed apparatus for supporting materials to be crosscut, a lightweight collapsible work surface, and a powered tool support apparatus.

SUMMARY OF THE INVENTION

It is therefore an object of the present invention to provide a collapsible infeed/outfeed apparatus for supporting materials to be crosscut.

It is a further object of the present invention to provide a collapsible infeed/outfeed apparatus that achieves the above object, and which also can be configured to act as a support apparatus for a powered crosscut type of saw.

It is yet another object of the present invention to provide a collapsible infeed/outfeed apparatus that achieves the above objects and which further yet may be configured as a collapsible, portable and lightweight work apparatus.

The invention achieves the above objects, and other objects and advantages that will become apparent from the description which follows, by providing a collapsible infeed/outfeed apparatus having a generally A-frame configuration. The apparatus includes a pair of foldable, laterally extensible work support surfaces in the form of wings that are pivotally connected to two pairs of foldable, elongated support legs. Each support leg pivotally supports a foldable strut having a first end pivotally connected to a corresponding support leg and a distal free end slidably connected to the foldable wing that corresponds to the connected leg.

In a preferred embodiment of the invention, the support legs and wings are pivotally connected to a pair of stanchions at an upper end thereof. A lower end of each stanchion is pivotally connected to a pair of foldable support braces having distal free ends that are slidably connected to the support legs. The stanchions may be provided with a telescoping roller that is retractable below the extended surface of the laterally extensible work support surfaces so as to provide an unobstructed upper surface for the apparatus. This central roller may be raised to an extended position with the work support surfaces collapsed into their stowed positions such that the apparatus may be used as an infeed/outfeed roller for a powered saw. The work support surfaces may also be provided at their free ends with a pair of extendable rollers that may be raised from the work support surfaces such that, when the central roller is retracted, a powered saw, such as a chop saw, miter saw, or the like may be positioned centrally on the apparatus, with the rollers on the work support surfaces acting as the infeed/outfeed rollers. The collapsible infeed/outfeed apparatus is thus capable of serving as an infeed/outfeed roller support (with the central roller extended, and the laterally extensible work support surfaces collapsed); a collapsible work apparatus (with the laterally extensible work support surfaces extended and all of the rollers retracted); and a powered saw support stand (with the laterally extensible work support surfaces extended, the central roller retracted, and the rollers at the end of the work support surfaces extended). In any event, the entire apparatus can be collapsed into a convenient form for carrying and storage.

In one embodiment of the present invention, the apparatus includes a shelf that is located below the apparatus surface between the legs. This shelf may act as a support in order to keep the apparatus in a deployed manner. In some embodiments there may be an additional support under the shelf to keep the shelf from collapsing. By using the shelf as an added support, stanchions can be removed to allow for a lighter more functional apparatus.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
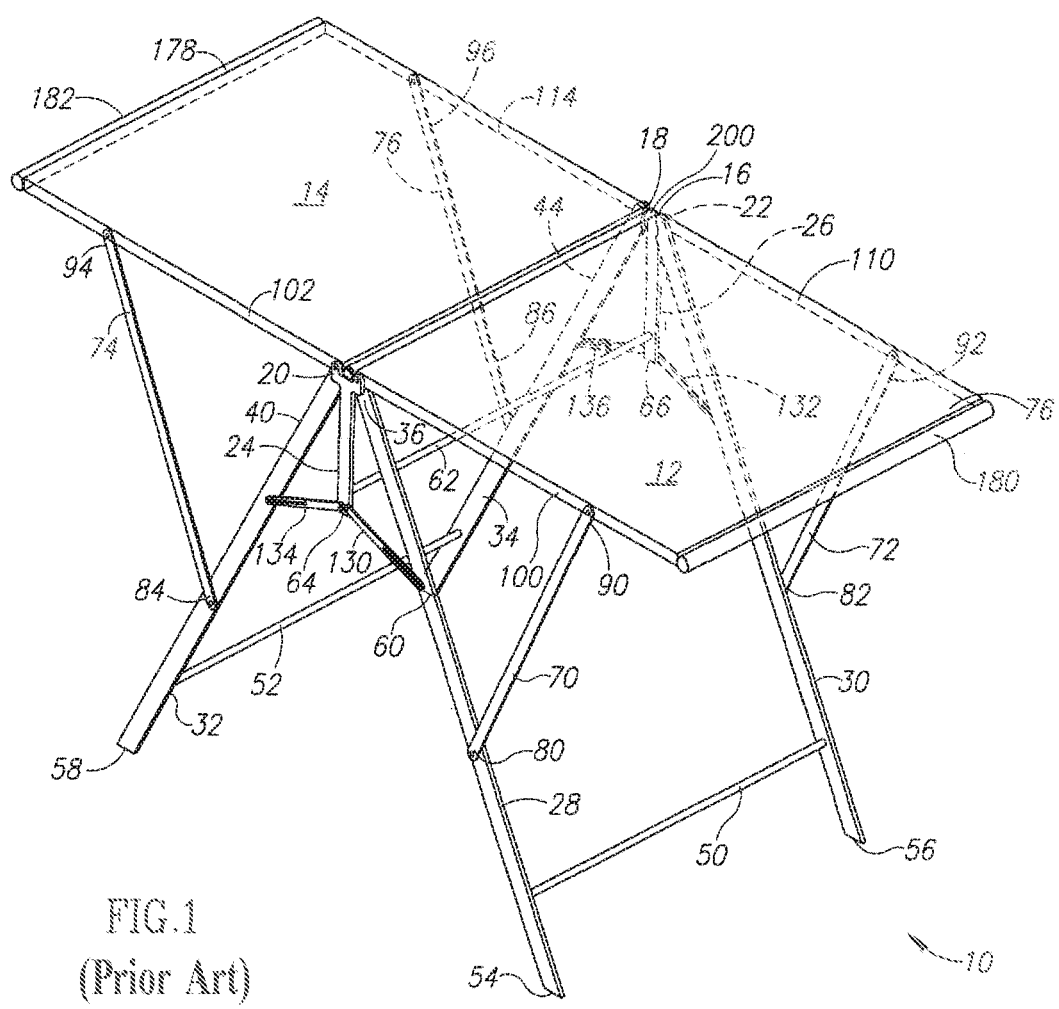
FIG. 1 is an isometric, top right perspective view of a collapsible infeed/outfeed apparatus in accordance with the present invention.
Figure 2:
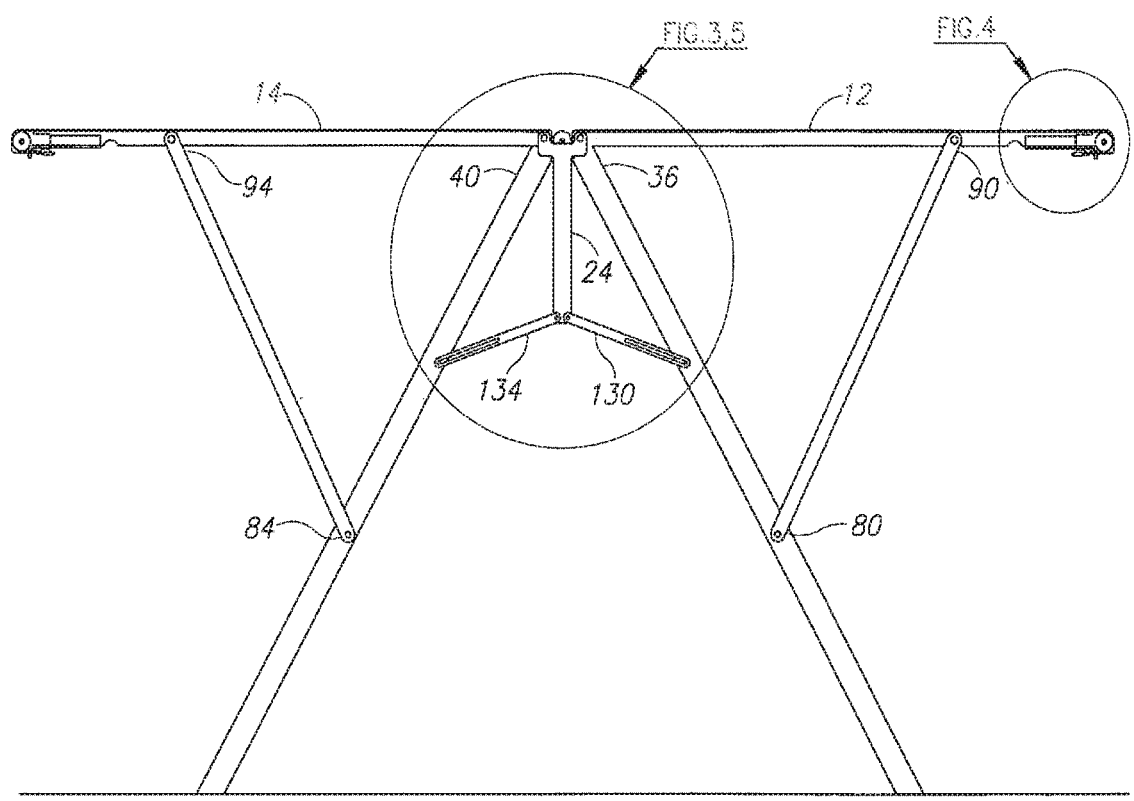
FIG. 2 is a side elevational view of the apparatus shown in FIG. 1.

A collapsible infeed/outfeed apparatus in accordance with the principles of the invention is generally indicated at reference numeral 10 in the various Figures of the attached drawings wherein numbered elements in the Figures correspond to like numbered elements herein.

Figure 3:
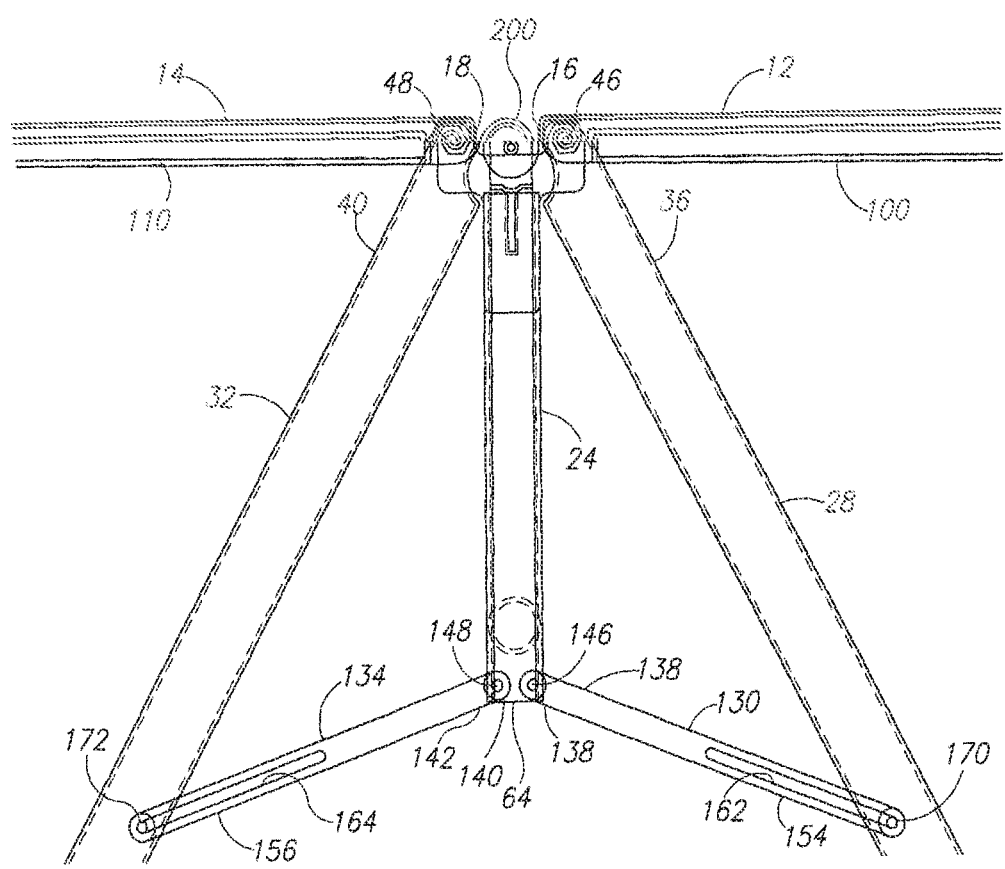
FIG. 3 is an enlarged, partial side elevational view of circled area 3 in FIG. 2.

The apparatus 10 has a pair of selectively foldable, laterally extensible work support surfaces or wings 12, 14 that may be used to support work materials, a powered crosscut type of saw (e.g., a miter saw, sliding compound crosscut saw, compact powered band saw, etc.) or as a support for rollers for purposes that will be described hereinbelow. The wings are preferably manufactured from a sturdy material, such as sheet steel, and may be perforated (not shown) to prevent sheet materials, such as plywood from adhering thereto in response to a partial vacuum at a surface interface of the working material with the apparatus. Each work surface has a corresponding inner end 16, 18 that is pivotally connected to bracket portions 20, 22 of a pair of vertical stanchions 24, 26 so that the wings 12, 14 may be pivoted between an extended position, shown in FIGS. 1 through 5, and a collapsed position (not shown) adjacent to two pairs of support legs 28, 30, 32, and 34. The support legs are elongated and have upper ends 6, 38, 40, and 44 that are coaxially pivotable about bracket portions 20, 22, such as by way of bolts 46, 48, as best seen in FIG. 3. The support legs are reinforced by support leg cross-braces 50, 52 adjacent to the free ends 54, 56, 58, and 60 of the corresponding support legs 28, 30, 32, and 34. Similarly, the stanchions 24, 26 are supported by a stanchion cross-brace 62 adjacent stanchion lower ends 64, 66.

Figure 4:
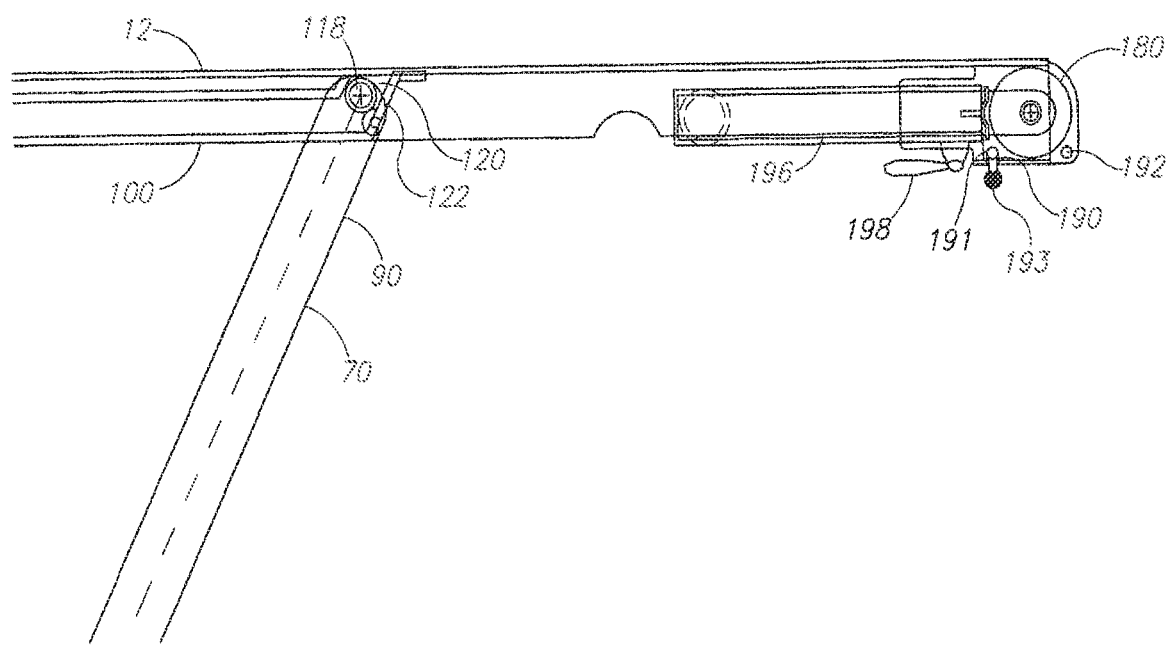
FIG. 4 is an enlarged, sectional side elevational view of the circled area 4 of FIG. 2.
Figure 5:
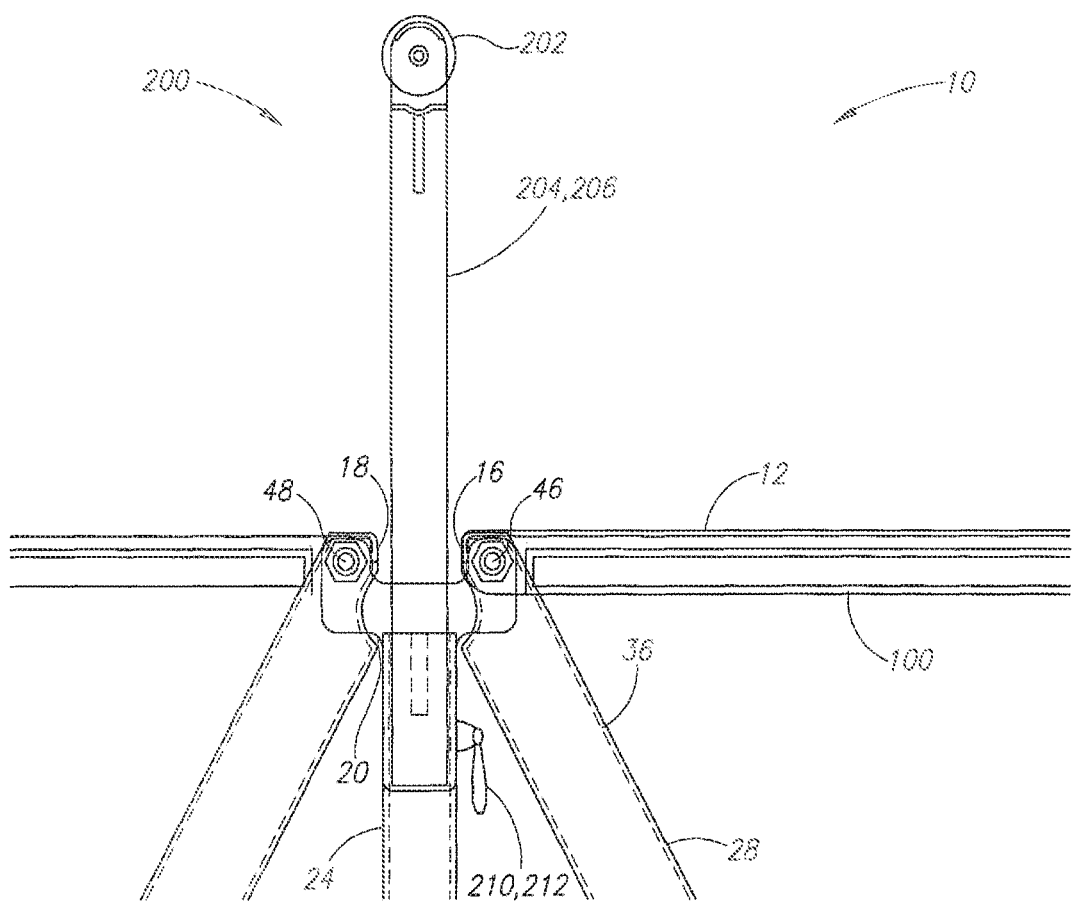
FIG. 5 is an enlarged, side elevational view similar to FIG. 3, showing the central roller in an extended position.

As will be apparent to those of ordinary skill in the art, the pivotal connection between the wings 12, 14, the elongated support legs 28, 30, 32, and 34, at the bracket portions 20, 22 of the stanchions 24, 26 permits the wings to be extendable to the position shown in the Figures, which is suitable for use as described above, and into a collapsed position (not shown) with the wings 12, 14 being nested against the support legs and the stanchions. In order to provide vertical load-bearing support for the wings 12, 14, the collapsible infeed/outfeed apparatus 10 is provided with two pairs of wing support struts 70, 72, 74, and 76. The wing support struts each have a first end 80, 82, 84, and 86 pivotally connected to a corresponding support leg 28, 30, 32, and 34, such as by bolts (not shown). Each wing support strut also has a free end 90, 92, 94, and 96 that is slidably received in a corresponding wing track 100, 110, 112, and 114, best seen in FIGS. 3 and 4. Each strut free end 90 is provided with a transverse pin, such as transverse pin 118, which may reside in a decent area 120 secured by spring clip 122 so as to maintain the wings, for example, wing 12, in the extended position as shown in the Figures. As best seen in FIG. 4, the detent area 120 is configured such that a load on the wing 12 biases the pin 118 into the detent to prevent the wing from collapsing until the spring clip 122 is overcome by lifting the wing 12 vertically and then collapsing the corresponding wing support struts 70, 72 in a manner well understood by those of ordinary skill in the art.

In order to further stabilize the support legs 28, 30, 32, and 34, the lower ends 64, 66 of the stanchions 24, 26 are provided with a pair of leg support braces 130, 132, 134, and 136. Each leg support brace inner end 138, 140, 142, 144 is pivotally connected to the corresponding lower end 64 or 66 of the corresponding stanchion 24 or 26, such as by bolts 146, 148. Brace distal portions 154, 156, 158, and 160 are provided with corresponding elongated slots 162, 164 166, and 168, which are connected to portions of the corresponding support legs intermediate the stanchion bracket portions, 20, 22 and the first ends 80, 82, 84, 86 of the wing support struts 70, 72, 74, and 76. This arrangement permits the foldable legs to collapse or extend in a controlled manner and also provides significant lateral support for the apparatus 10 when the wings 12, 14 are in the extended position shown in the Figures.

As will be apparent to those of ordinary skill in the art, the above fundamental structure of the collapsible infeed/outfeed apparatus 10 provides a sturdy surface (when all the above-described structural elements are in their extended positions) to support significant vertical loads. It will be appreciated that when the apparatus is in its extended position shown in the Figures, and a load is placed on the work surface defined by the wings 12, 14 all of the structural members except the legs 28, 30, 32, 34; stanchions 24, 26 and wing support struts 70, 72, 74, 76 are in tension, providing for an extremely apparatus structure. In the preferred embodiment, each of these elements is made of formed sheet metal, such as steel, which has high strength in tension. Structural elements that are in compression, such as the legs, wing support struts and stanchions are either pivotally connected to another structure, (such as support legs 28, 30, 32, and 34) or are received in sliding tracks 100, 110, 112, and 114 in positions that are close to vertical so as to have significant rigidity in compression. Therefore, the collapsible infeed/outfeed apparatus 10 may be manufactured from relatively light-gauge steel and still have sufficient strength to support a heavy item, such as a powered chop saw, sliding crosscut saw, etc.

As will be apparent to those of ordinary skill in the art upon reviewing the above disclosure, the inherent strength of the apparatus 10 assures that the apparatus is well adapted for a variety of uses. When used to support a powered saw, such as a crosscut type of saw, the saw may be placed in the middle of the apparatus. Advantageously, the wing free ends 176, 178 are provided with extensible roller structures 180, 182, best seen in FIG. 4. Each wing has on a lateral side thereof two apertures, 191, 192 that may be selectively engaged by a removable pin 193 to permit the extensible roller structure to achieve a vertical orientation with respect to the wing 12. The structure is provided with a telescoping mechanism 196 controlled by a clamp 198, allowing the roller 180 to be elevated above the surface of the wing 12 up to approximately 3 inches. The roller structures 180, 182 associated with the free end of each wing provide a relatively frictionless input and output surface elevated above the surface of the apparatus to receive material that is to be crosscut on the powered saw (not shown). Similarly, the stanchions 24, 26 are also provided with a telescopic roller assembly 200, best seen in FIGS. 3 and 5. The roller assembly 200 includes an elongated roller 202 rotationally mounted on a pair of masts 204, 206 that nest inside each corresponding stanchion 24, 26. Conventional hand-operated clamps 210, 212 are provided on each stanchion 24, 26 to permit an operator to adjust the telescopic roller assembly 200 to a desired height from below the surface of the wings 12, 14 in the depressed area of the stanchion bracket portions 20, 22, up to approximately 6 inches above the surface of the wings 12, 14. In this manner, and with the wings 12, 14 collapsed, the apparatus 10 can be used as an infeed, outfeed roller support with the configuration similar to that of a sawhorse with a conventional roller attached to the top thereof. Thus, the above, preferred embodiment of the invention is usable either as a work support apparatus with all of the roller assemblies retracted and the wings extended, a crosscut saw support apparatus with the central, telescopic assembly roller 200 retracted and the wing extensible roller structures 180, 182 extended, or as a roller infeed or outfeed support with the central telescopic roller assembly 200 extended and the wings 12, 14 collapsed.

Figure 6:
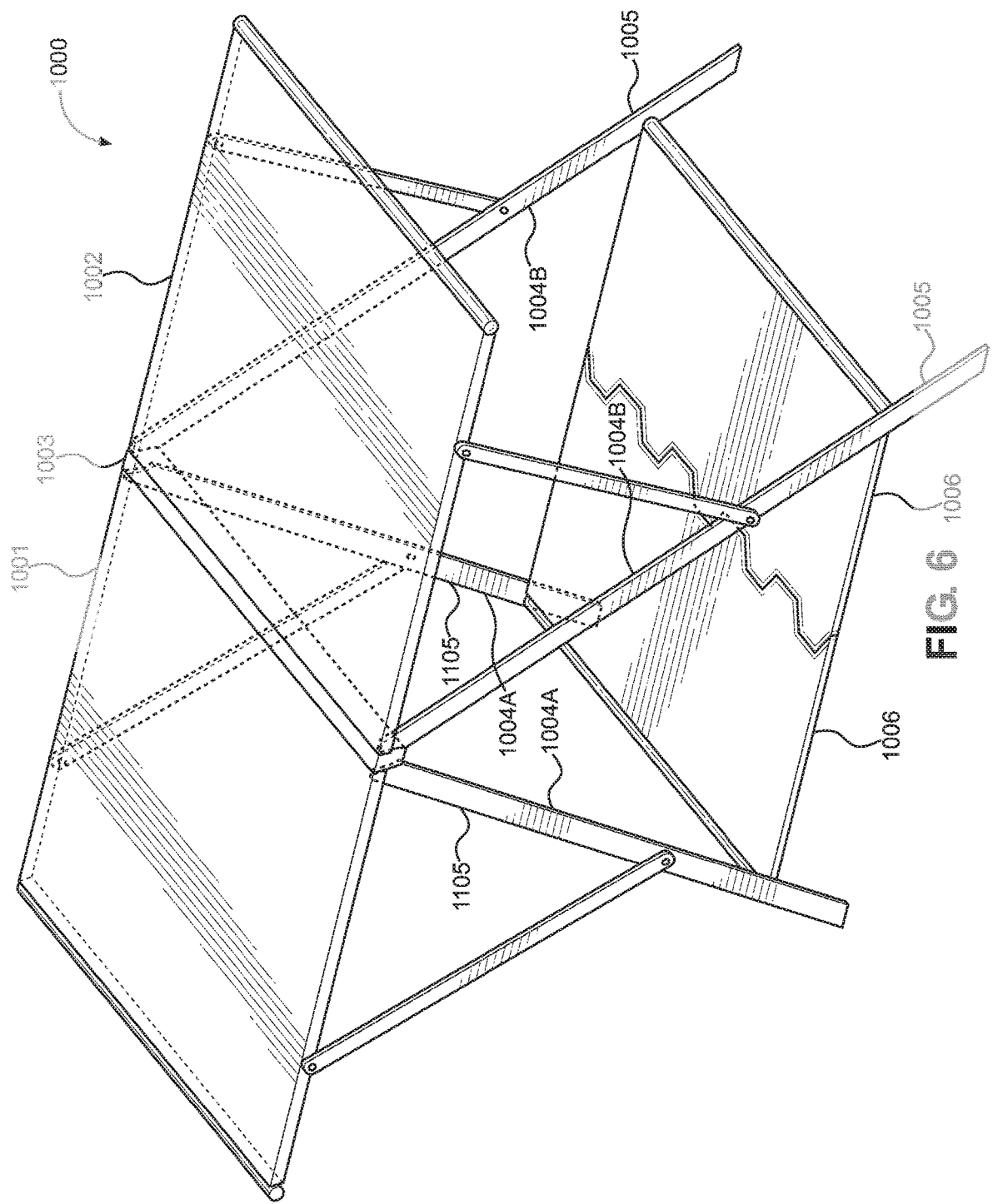
FIG. 6 shows a side elevation view of an embodiment of the apparatus with the shelf underneath.

FIGS. 6-15 show alternate or preferred embodiments of the invention. Referring now to FIG. 6, there is shown an embodiment of a work bench 1000. This work bench has a first apparatus top section 1001 and a second apparatus top section 1002. These apparatus top sections (1001, 1002) can be made from a molded plastic, according to one embodiment. In an embodiment where the apparatus top sections are plastic, they may have a rib structure added to the sections to increase strength of the apparatus. In other embodiments the apparatus top sections (1001, 1002) may be made from wood, metal, or other polymers or similar materials. The apparatus 1000 is held together with a central support structure 1003. In one embodiment the central support structure may also function as a handle. The central support structure may be formed to have a handle that will lay flat with the work surface when the apparatus top sections are deployed. The apparatus top sections 1001 and 1002 are pivotally attached to the center support structure 1003. These pivotal attachments will allow the apparatus top sections (1001, 1002) to fold into a down or closed position. In one embodiment this central support structure 1003 may be a bar that runs across a length of the apparatus 1000. In other embodiments, the center support structure 1003 can be a structure configured to accept pins or screws to secure everything together. In this embodiment, the central support structure 1003 may include a handle thereon for carrying the apparatus.

Below the apparatus top there are two sets of legs 1004A and 1004B. The legs and other bars may have a reinforcement structure therein. The reinforcement structure may be a series of cross sections that are located therein. Each set of legs has at least two leg supports 1005. The apparatus has a shelf 1006 pivotally attached to the legs 1005. In one embodiment this shelf 1006 can be made from molded plastic. In other embodiments the shelf 1006 can be made from metal, wood, or other polymers. In one embodiment, the shelf 1006 can be split down a middle thereof to allow the shelf 1006 to fold with the apparatus 1000. In a second embodiment, this split can be created using offsetting flanges. These flanges can provide extra support to the shelf.

Figure 7:
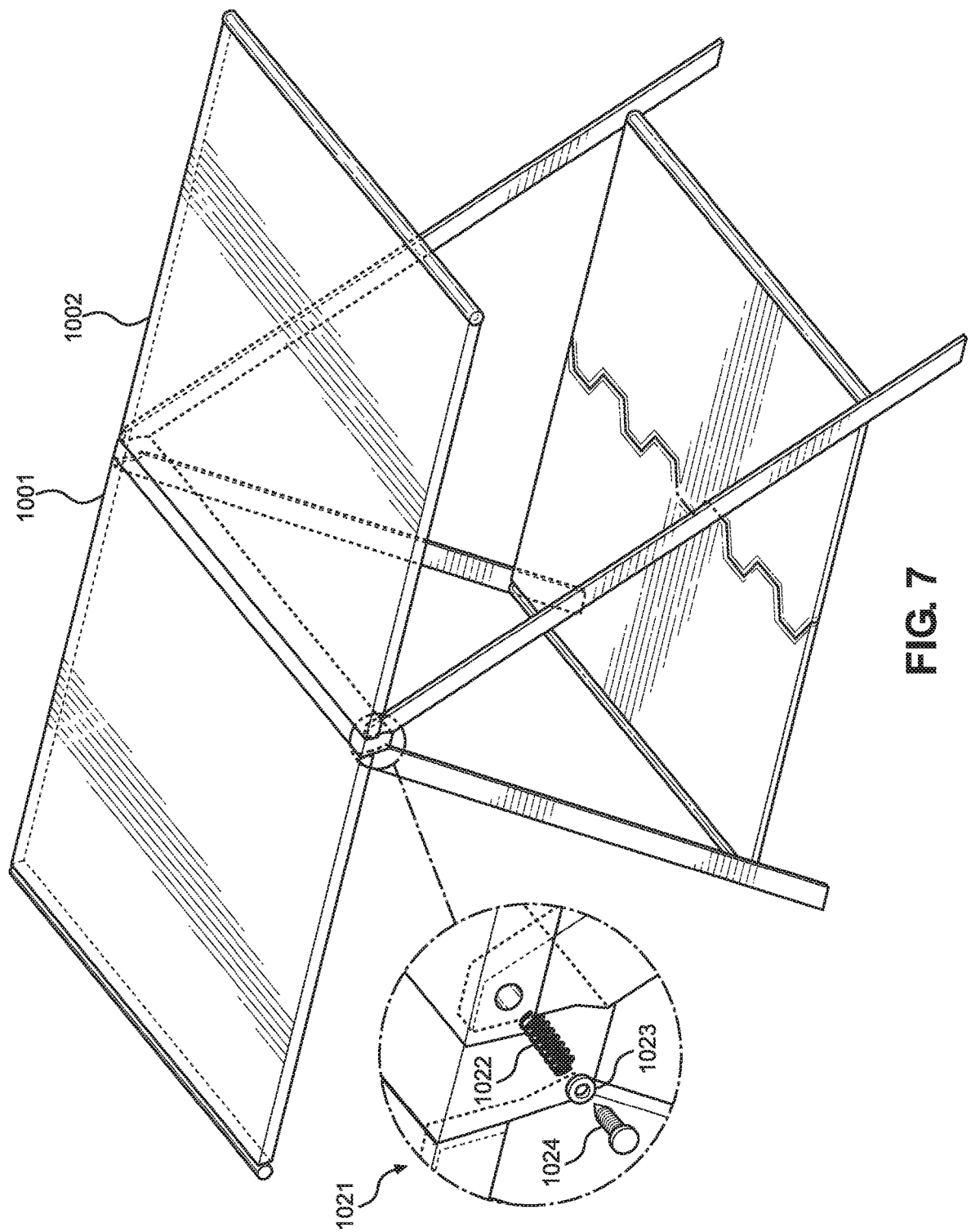
FIG. 7 shows a close-up, inset exploded view of an embodiment of the apparatus, depicting the apparatus top attachment.

Referring to FIG. 7, there is shown an exploded, inset view of an embodiment of the apparatus where the apparatus tops 1001 and 1002 are connected to the center support structure via a spring assembly 1021. The spring assembly is made up of a spring 1022 that is partially inserted into one of the apparatus tops 1001, 1002. A connector 1023 allows the spring 1022 to be connected to a pin 1024. The pin 1024, once connected to the spring 1022 and inserted into the apparatus top, is configured to support the apparatus top in the upright configuration, as shown. This spring assembly allows the apparatus tops 1001, 1002 to flex when in the folded position. This prevents a user's finger from being injured if it is positioned within the apparatus.

Figure 8:
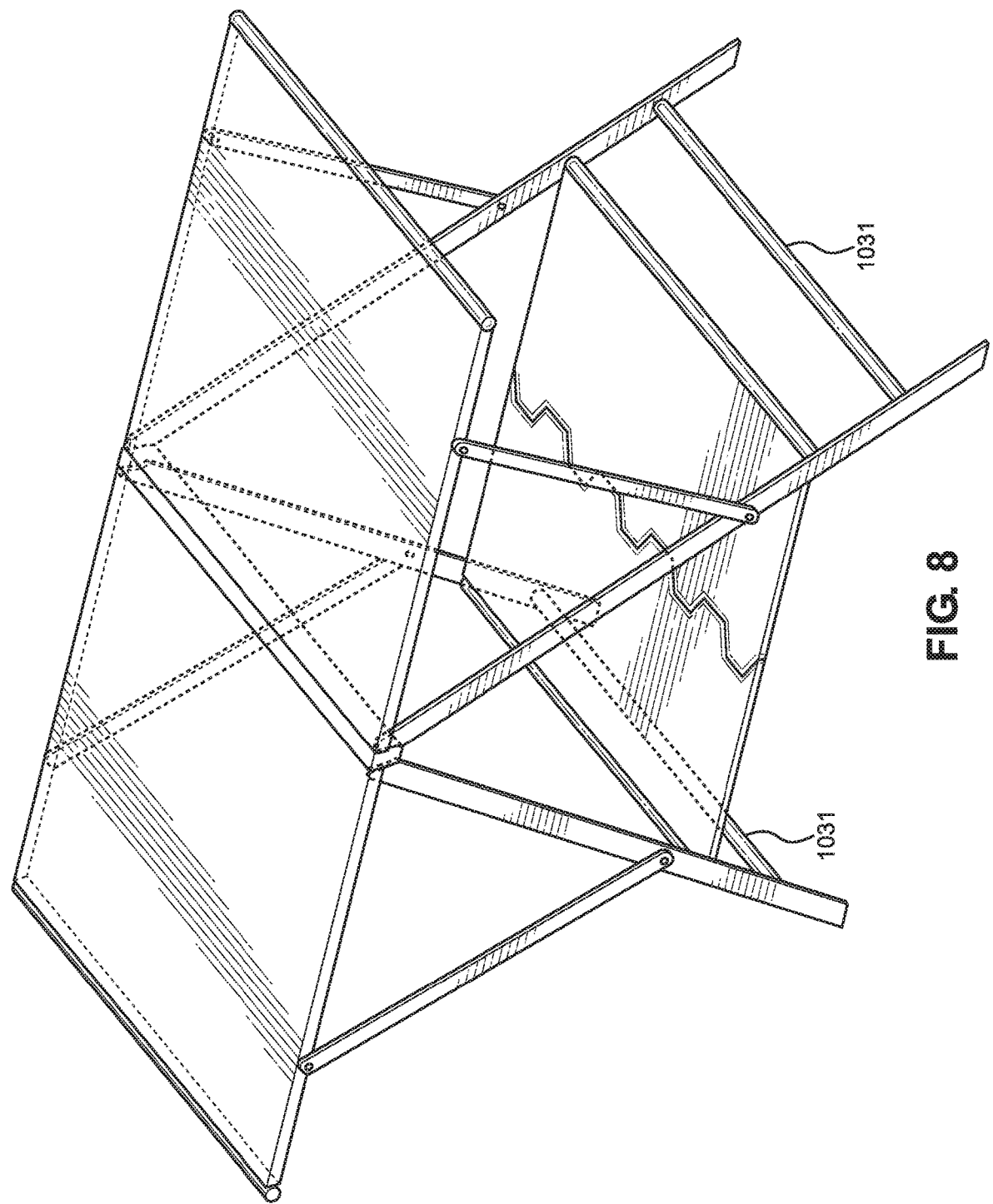
FIG. 8 shows an embodiment of the apparatus with additional leg supports positioned below the shelf.

Referring to FIG. 8, there is shown an embodiment of an apparatus with an additional support bar 1031 located between each set of legs. These support bars can be located either above or below the shelf. In this manner, the support bar 1031 adds extra support to the legs. The support bar 1031 can be made from metal or any strong material.

Figure 9:
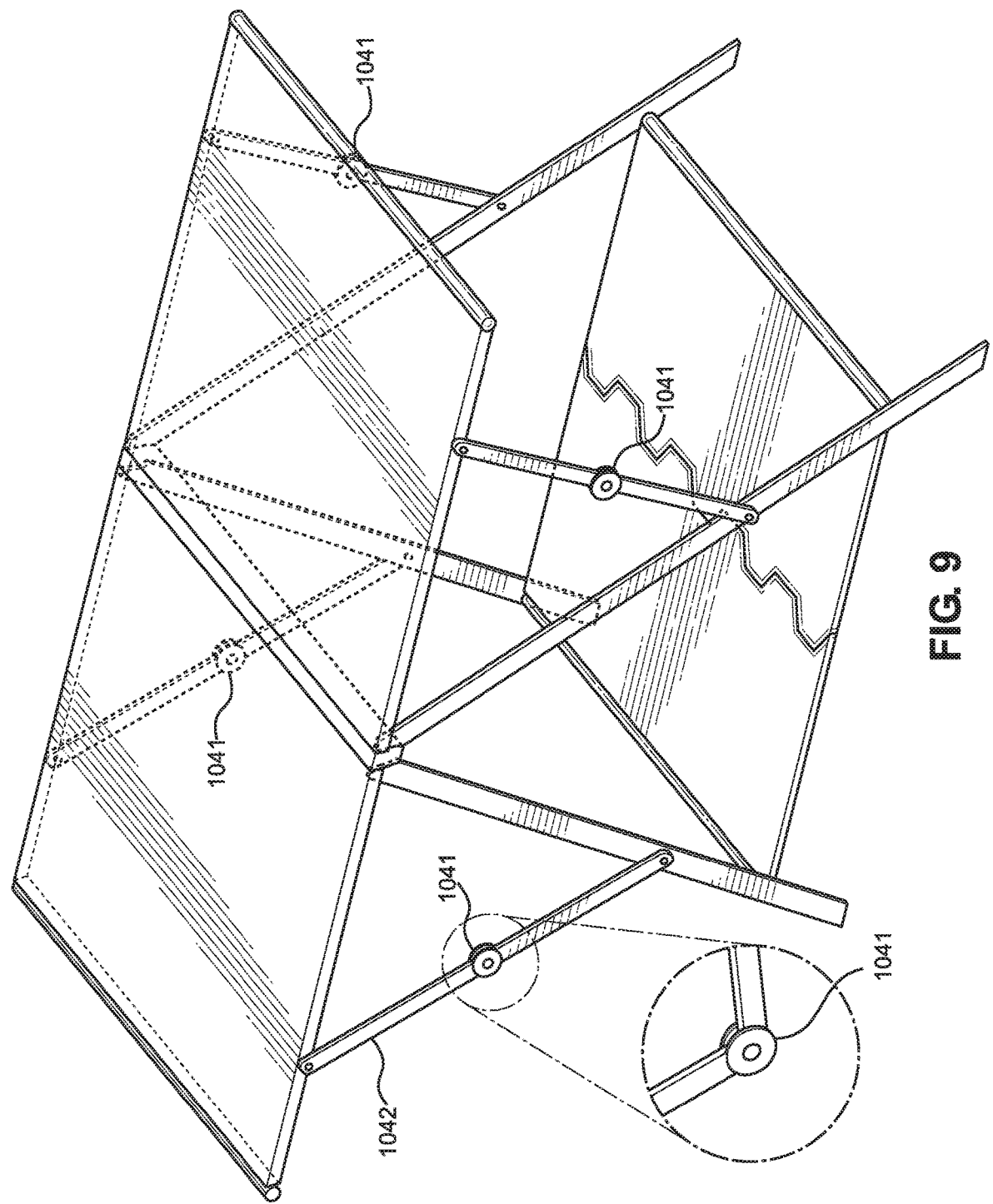
FIG. 9 shows a close-up, inset view of pivots in the leg supports of an embodiment of the apparatus.

Referring to FIG. 9, there are shown leg supports 1042 going from each leg to the respective apparatus top sections. These leg supports 1042 will allow for the apparatus to remain in the upright position as more weight is placed on the apparatus. In this particular embodiment there is a hinge 1041 placed on the leg support 1042. This allows for the support 1042 to be folded with the apparatus top for storage or transport of the apparatus.

Figure 10:
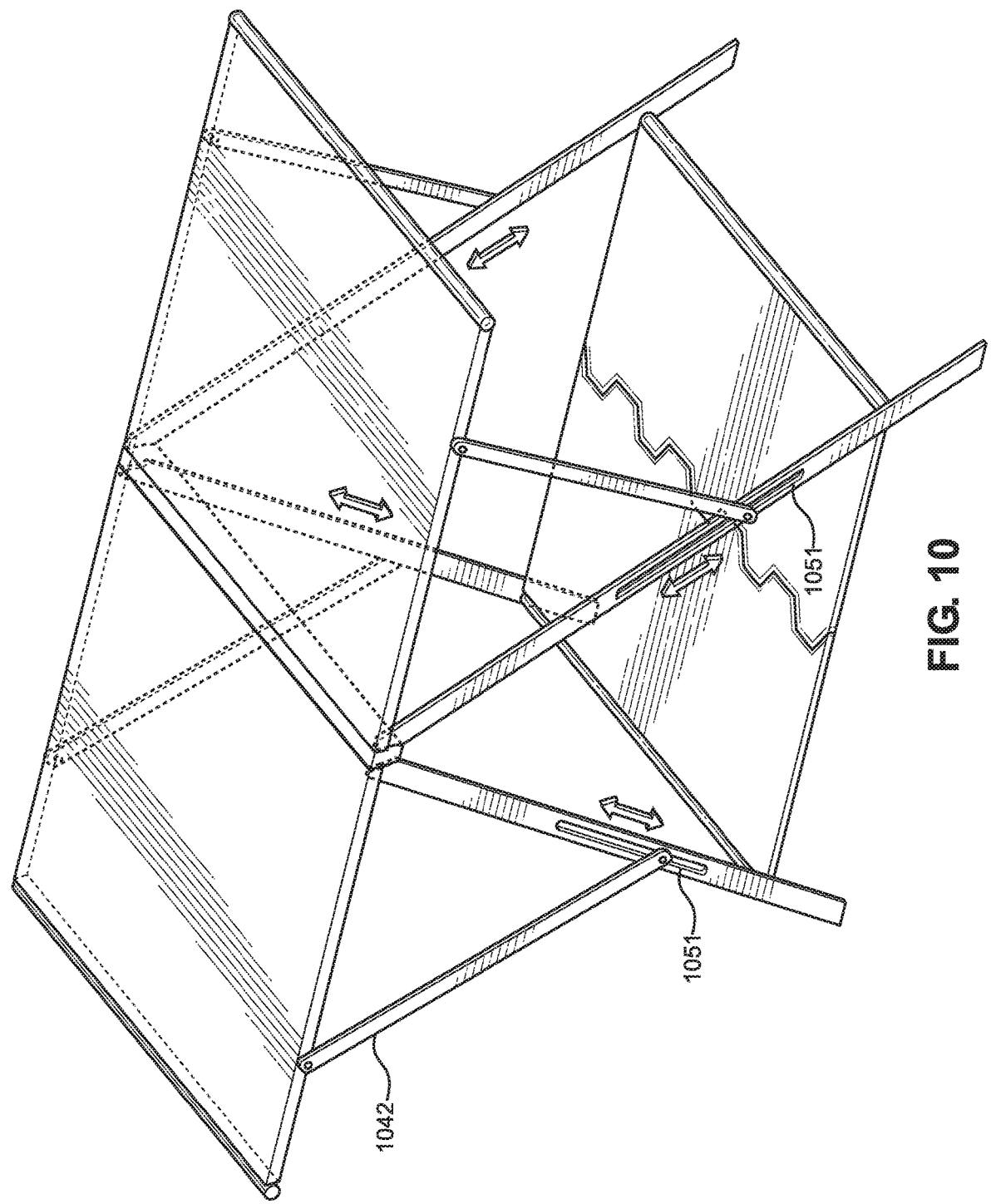
FIG. 10 shows a side view of an embodiment of the apparatus wherein the leg supports can slide in the legs.
Figure 11:
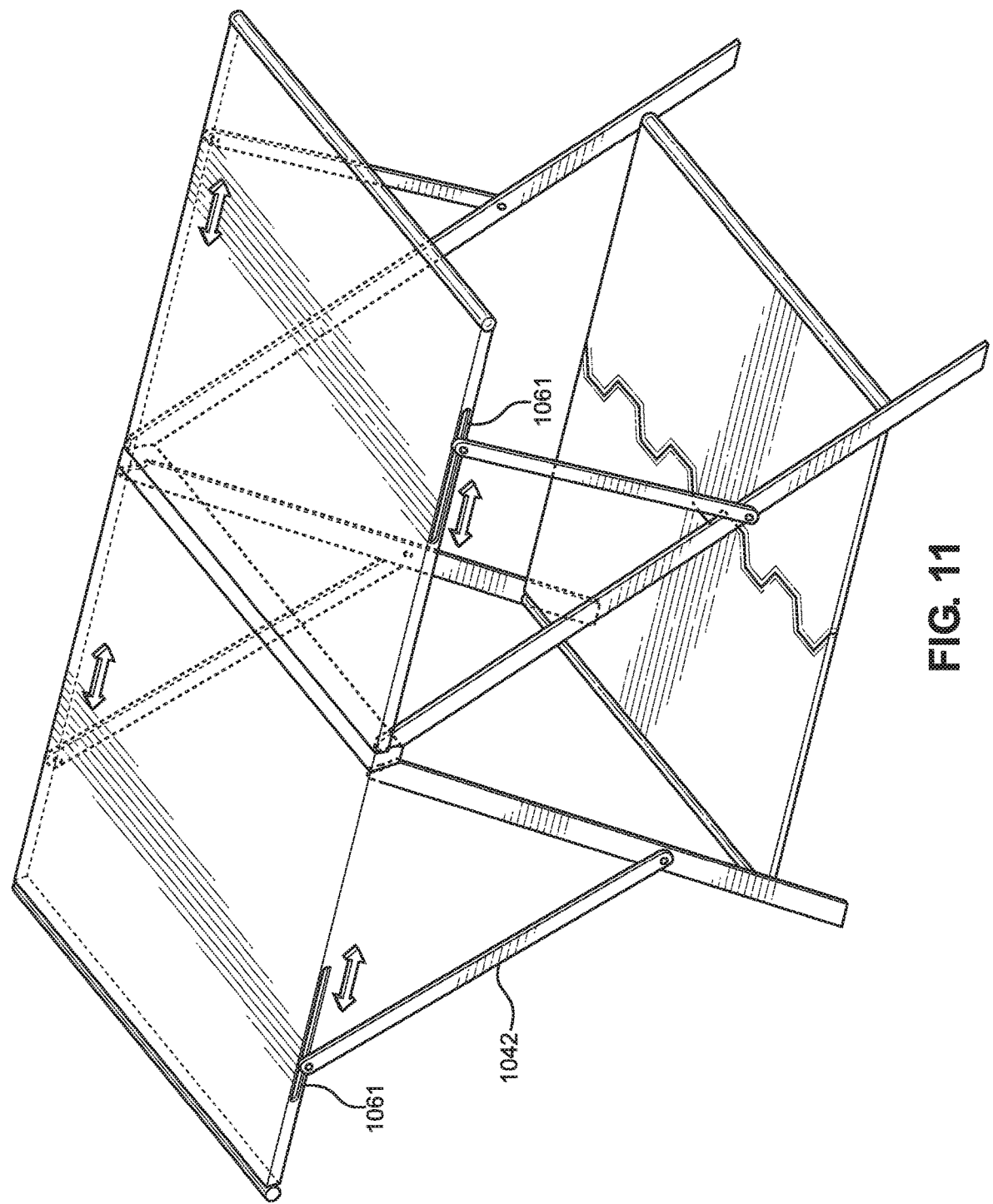
FIG. 11 shows a side view of an embodiment of the apparatus wherein the leg supports can slide in the apparatus top.

Referring to FIG. 10 and FIG. 11, there are shown slidable connections placed on either the legs 1051 (FIG. 10) or the apparatus top 1061 (FIG. 11). These slidable connections 1051 allow the leg supports 1042 to be folded when the apparatus top sections are folded into the down position. These slidable connections allow for the leg supports to be in one solid section with no breaks therein for a pivot point and add more strength.

Figure 12:
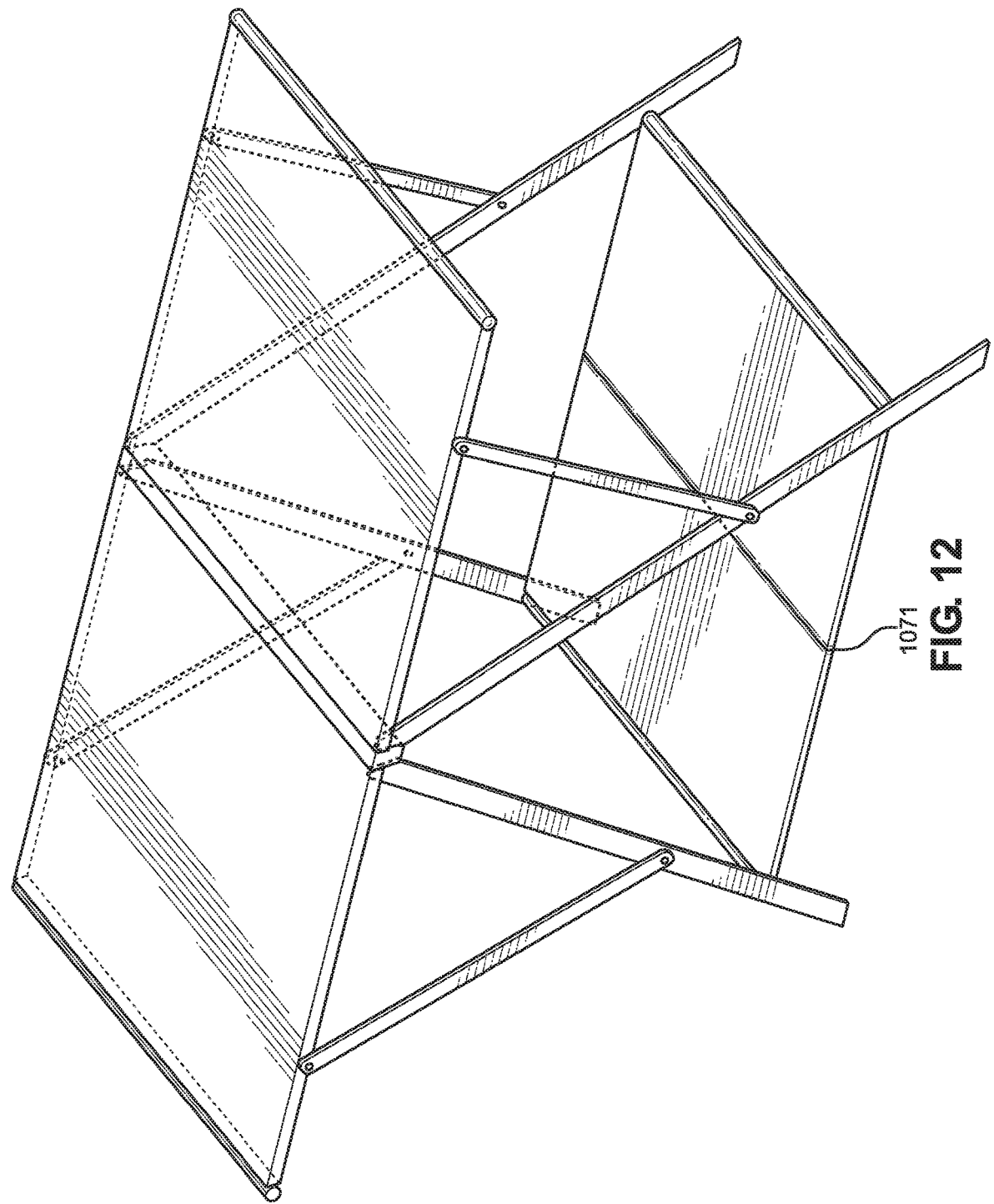
FIG. 12 shows a side elevation view of an embodiment of the apparatus wherein the shelf has a straight split down a middle of the shelf.

Referring to FIG. 12, the shelf is split in the middle with a straight split 1071. This is differentiated from the other embodiments where the split is a series of offsetting flanges. The straight split can come together in an overlapping manner such that the split locks together in the folded-out position.

Figure 13:
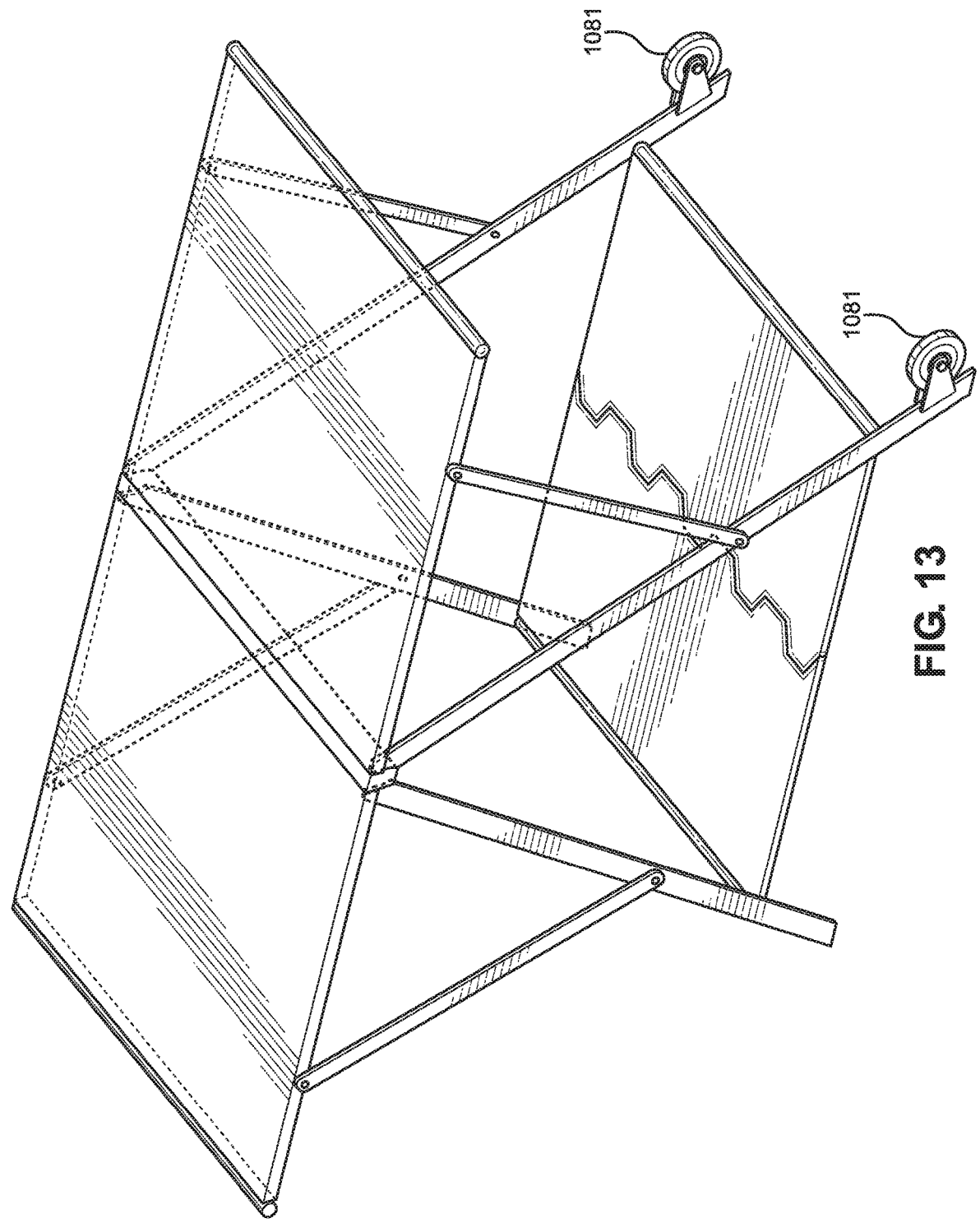
FIG. 13 shows a side elevation view of an embodiment of the apparatus wherein the apparatus includes a set of wheels on one set of legs of the apparatus.

Referring to FIG. 13, there is shown a wheel 1081 attached to each leg in one set of legs. In this embodiment the apparatus can be lifted slightly such that the legs without the wheels are above the ground. This will engage the wheels and allow the apparatus to be rolled along a surface. In this manner the apparatus does not have to be folded to be moved.

Figure 14:
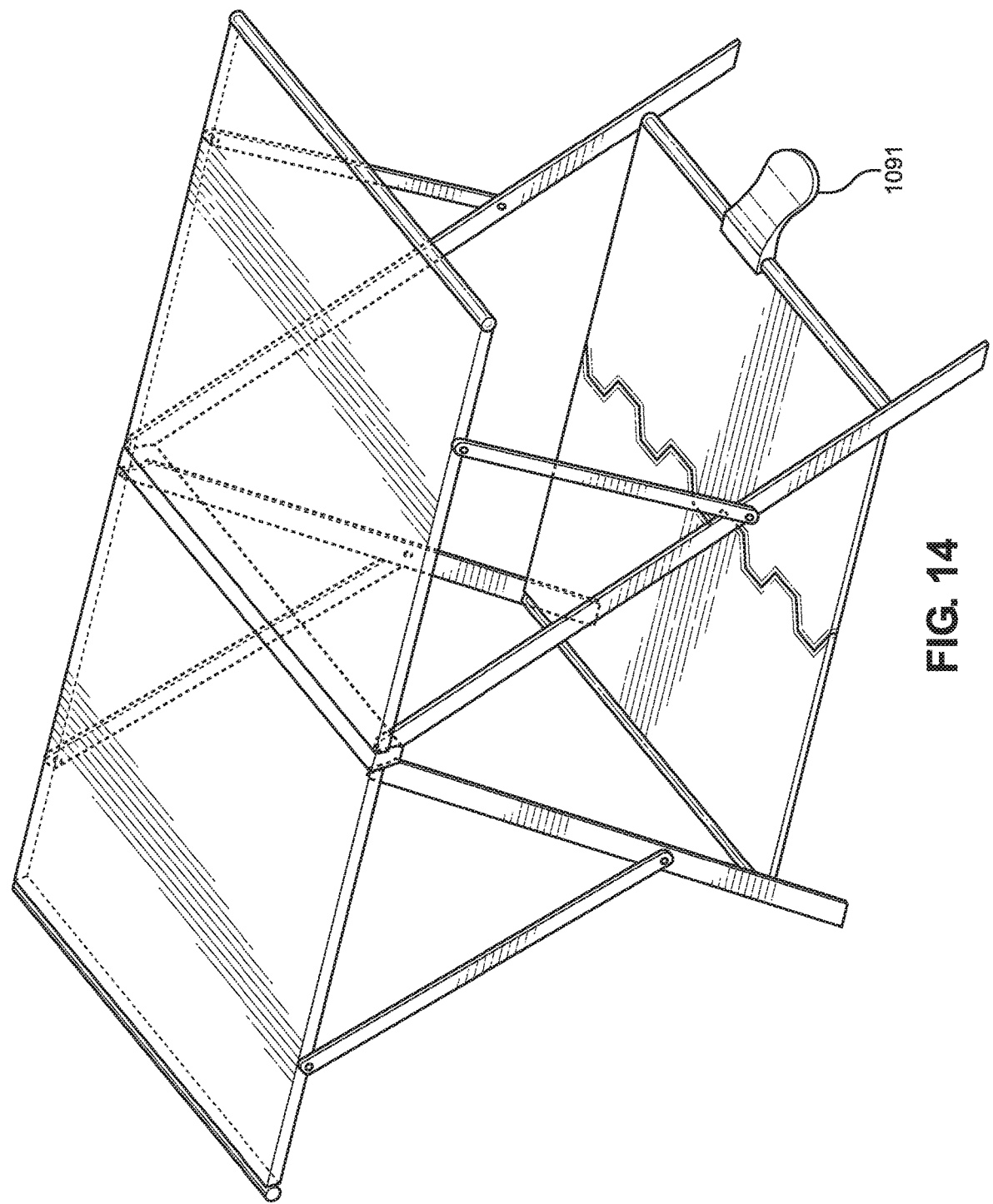
FIG. 14 shows a side elevation view of an embodiment of the apparatus wherein the apparatus includes a foot pedal to unlock the apparatus.
Figure 15:
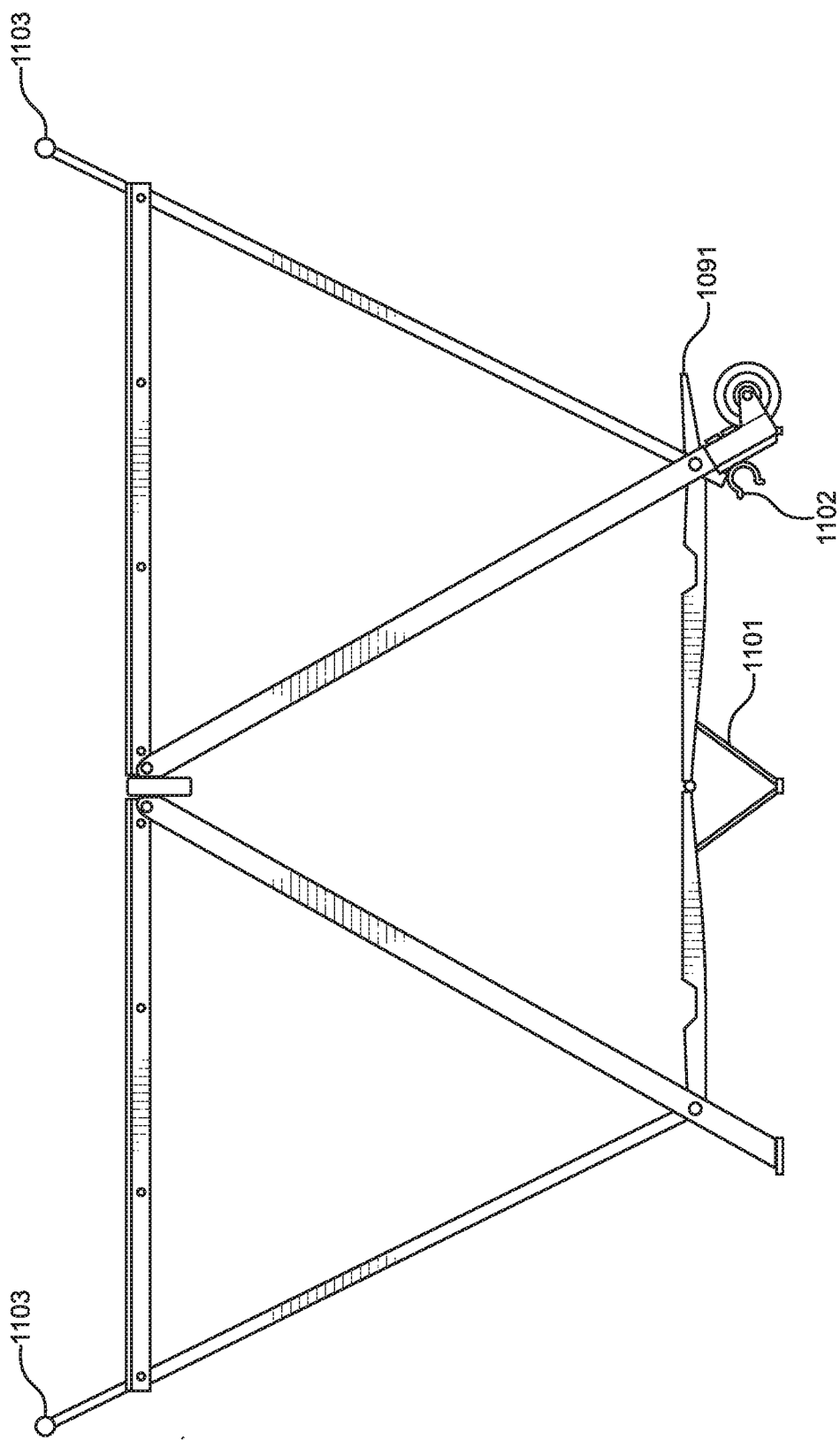
FIG. 15 shows a side view of an embodiment of the apparatus wherein the apparatus includes a shelf support and the apparatus lock.

Referring to FIG. 14 and FIG. 15, there is a foot pedal 1091 and a locking assembly 1102 that locks the apparatus in a closed position by clamping onto the opposite set of legs or to the shelf bar. The locking assembly has a top clamp and a bottom clamp that may be biased in a closed position. The foot pedal releases the locking assembly 1102 by separating the top clamp from the bottom clamp. This will prevent the bench from opening unexpectedly and potentially causing injury.

Referring to FIG. 15, there is a V shaped support 1101 under the shelf. This support may be pivotally attached to the shelf. Further, the apex of the support may also have a pivot attachment. In this embodiment these pivot attachments will allow the support to fold together when the bench is folded for storage. This support 1101 prevents the shelf from collapsing under a weight placed on the apparatus. Further, this support prevents the shelf from reaching a full 180 degree lock out position. In this manner the shelf can be easily folded when the apparatus is put in the storage position. There are also risers 1103 placed on the ends of each apparatus top section. These risers 1103 may have an adjustable apparatus top height and allow for a plank or other item to be risen to match the height of a saw placed on the apparatus, for example. These risers can also serve as vises and hold a plank or the other item down on the apparatus. This is possible by placing the plank or other item under the riser and locking the riser down tight against the plank or other item.

In one embodiment the apparatus is an A frame truss design. This design allows the apparatus to be used without lifting the apparatus tops into the deployed position. This means that the apparatus can be used like a sawhorse. Further, this design allows the apparatus to become stronger the more weight that I placed on it. As weight is placed on the apparatus the apparatus tops will push down on the leg supports. This will then push the legs down and out. In this manner the apparatus will be less likely to collapse or fold in on itself.

Figure 16:
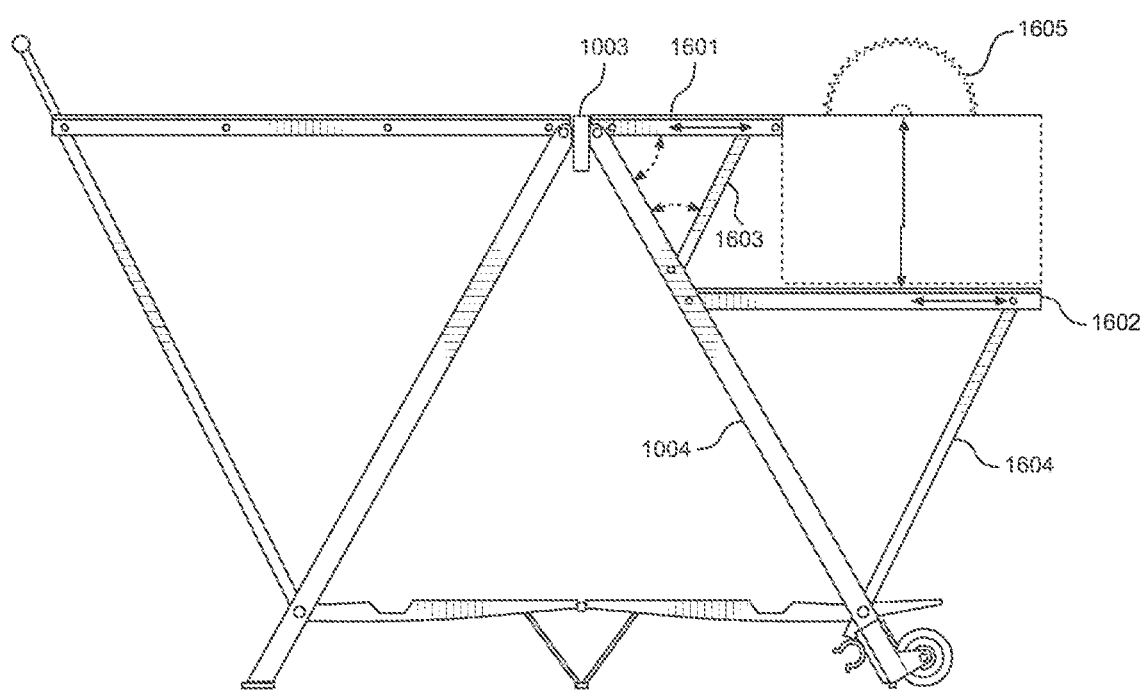
FIG. 16 shows a side view of an embodiment of the apparatus wherein the apparatus has an apparatus saw-holding portion.

Referring now to FIG. 16, there is shown a side view of an embodiment of the apparatus wherein the apparatus has an apparatus saw holding portion. In one embodiment the apparatus has been configured to support an apparatus saw. In this embodiment one of the apparatus top sections is divided into an upper apparatus top section 1601 and a lower apparatus top section 1602. The apparatus has an upper apparatus top section 1601. The Upper apparatus top section 1601 is connected to the center support structure 1003. In one embodiment the upper apparatus top section 1601 is hingedly connected to the center support structure 1003. This will allow the upper apparatus top section 1601 to be folded down against the support leg 1004. In one embodiment the upper apparatus top section 1601 has a diagonal support 1603. The diagonal support 1603 is hingedly connected to the upper apparatus top section 1601 and the support leg 1004.

A lower apparatus top section 1602 is attached below the upper apparatus top section 1601. The lower apparatus top section 1602 is attached to the support leg 1004. The lower apparatus top section 1602 further has a diagonal support 1604. The diagonal support 1604 is hingedly attached to the second apparatus top section 1602 at one end and hingedly connected to the support leg 1004 at a second end. In one embodiment the lower apparatus top section 1602 is positioned at a height below the upper apparatus top section 1601 that will allow an apparatus saw to be placed thereon. The apparatus saw top and apparatus saw blade 1605 will be at a position level with the upper apparatus top section 1601.

Figure 17:
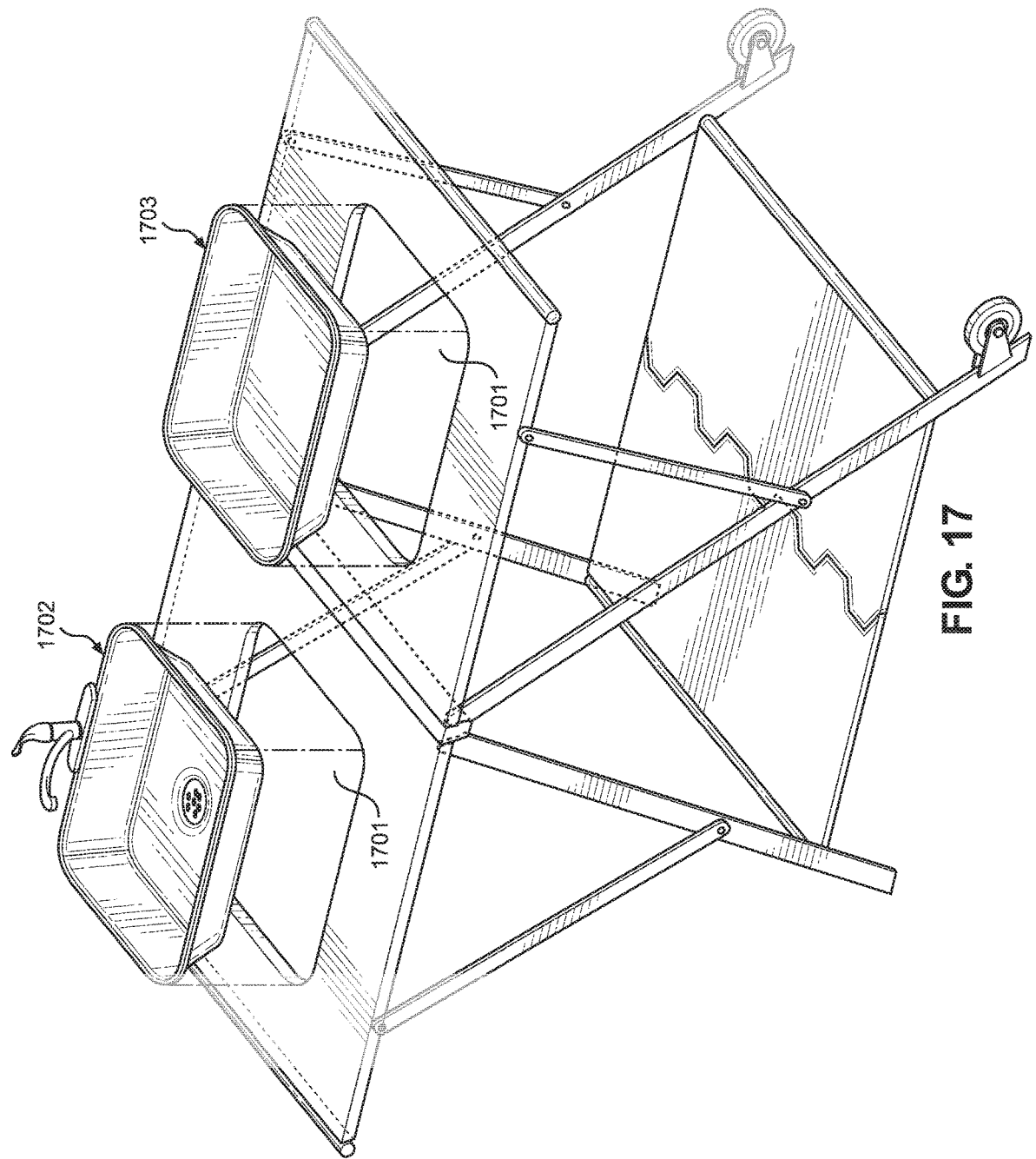
FIG. 17 shows a perspective view of an embodiment of the apparatus with a removable sink.

Referring now to FIG. 17, there is shown a perspective view of an embodiment of the apparatus with a removable sink. In one embodiment an apparatus top section has an aperture 1701 placed therein. The aperture 1701 is proportioned to fit an item therein. In one embodiment the aperture is configured to have a sink 1702 placed therein. In another embodiment the aperture is configured to have a tub 1703 placed therein. In these embodiments the sink 1702 or tub 1703 is removably placed within the apertures. This will allow the sink 1702 or tub 1703 to be removed and the apparatus to fold flat.

Figure 18:
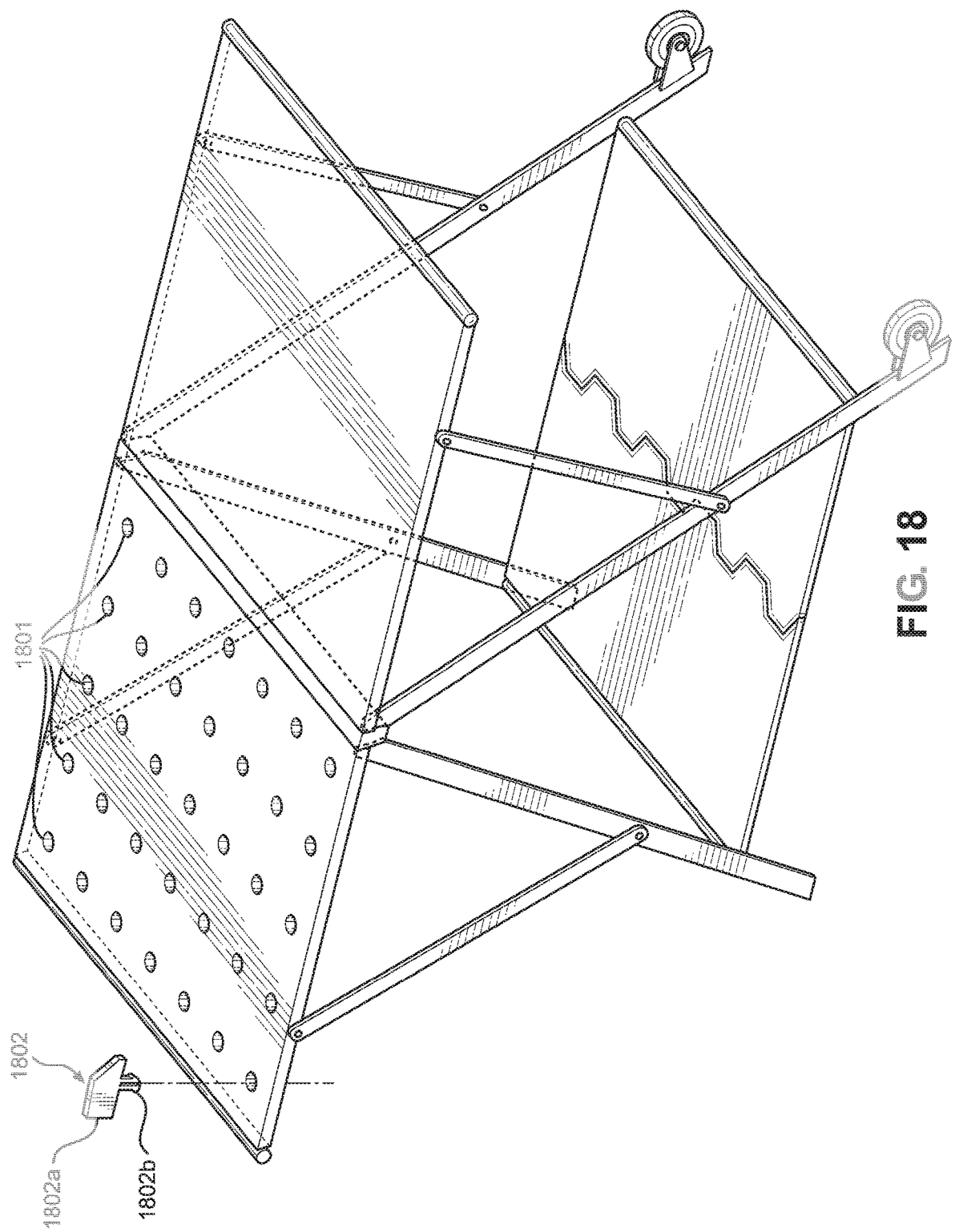
FIG. 18 shows a perspective view of an embodiment of the apparatus with a plurality of apertures therein.

Referring now to FIG. 18, there is shown a perspective view of an embodiment of the apparatus with a plurality of apertures located therein. In the shown embodiment the apparatus top section has a plurality of apertures 1801 placed therein. In one embodiment the apertures 1801 are placed into the apparatus top section in a grid formation. In another embodiment the apertures 1801 are placed in a zigzag pattern.

In one embodiment the apertures 1801 are configured to accept a support device 1802. The support device 1802 will allow for wood or other materials to be held in place or guided. In one embodiment more than one support device 1802 may be placed into different apertures 1801. The support device 1802 has at least on flat edge 1802a that is configured to sit perpendicular to the apparatus top section when placed within the aperture 1801. The support device 1802 has a plug 1802b placed on the lower side of the support device 1802. In one embodiment the plug 1802b has a wider lower portion such that it will lock the support device 1802 within the aperture 1801.

Figure 19:
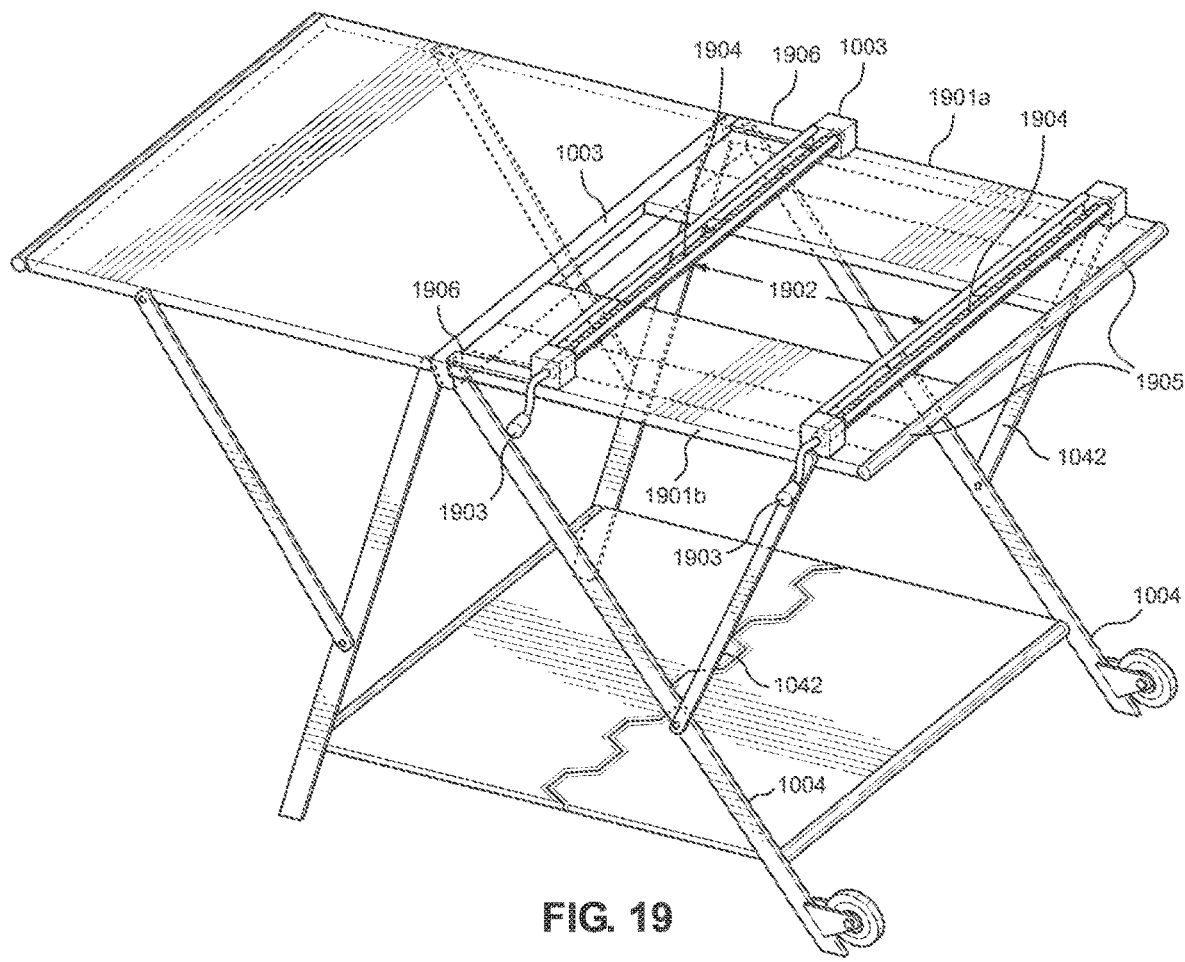
FIG. 19 shows a perspective view of an embodiment of the apparatus with an adjustable vise apparatus top.

Referring now to FIG. 19, there is shown a perspective view of an embodiment of the apparatus with an adjustable vise apparatus top. In one embodiment an apparatus top section has the ability to open and close. This is facilitated by the pair of screw supports 1902. The apparatus top section has a first side 1901a and a second side 1901b. The first apparatus top section 1901a and the second apparatus top section 1901b are each attached to an apparatus top support 1905. In one embodiment the apparatus top supports 1905 are elongated bars attached to a bottom side of each apparatus top section 1901a, 1901b.

One of the pair of screw supports 1902 is hingedly attached to the center support structure 1003. In one embodiment there is a hinge bar 1906 attached to each end of the screw support 1902. The hinge bar is hingedly connected to the center support structure 1003, thus attaching the screw support to the center support structure. The other screw support 1903 is attached to the support bars 1042. The support bars are hingedly connected to the ends of the screw support 1902 at one end, and the apparatus leg at the other end.

Each of the screw supports 1902 includes a screw 1904. The screw has opposite threads starting at an end of the screw 1904 respectively. The opposite threads meet in the middle of the screw 1904. There is a hand crank 1903 located at one end of each screw support 1902. The hand crank is configured to rotate the screw 1904. The apparatus top support bars 1905 each have threaded attachment sections. The threaded attachment sections are attached to the screws 1904 of the screw supports 1902. The threaded attachment sections are configured to move the apparatus top sections 1901a, 1901b together or apart.

Figure 20:
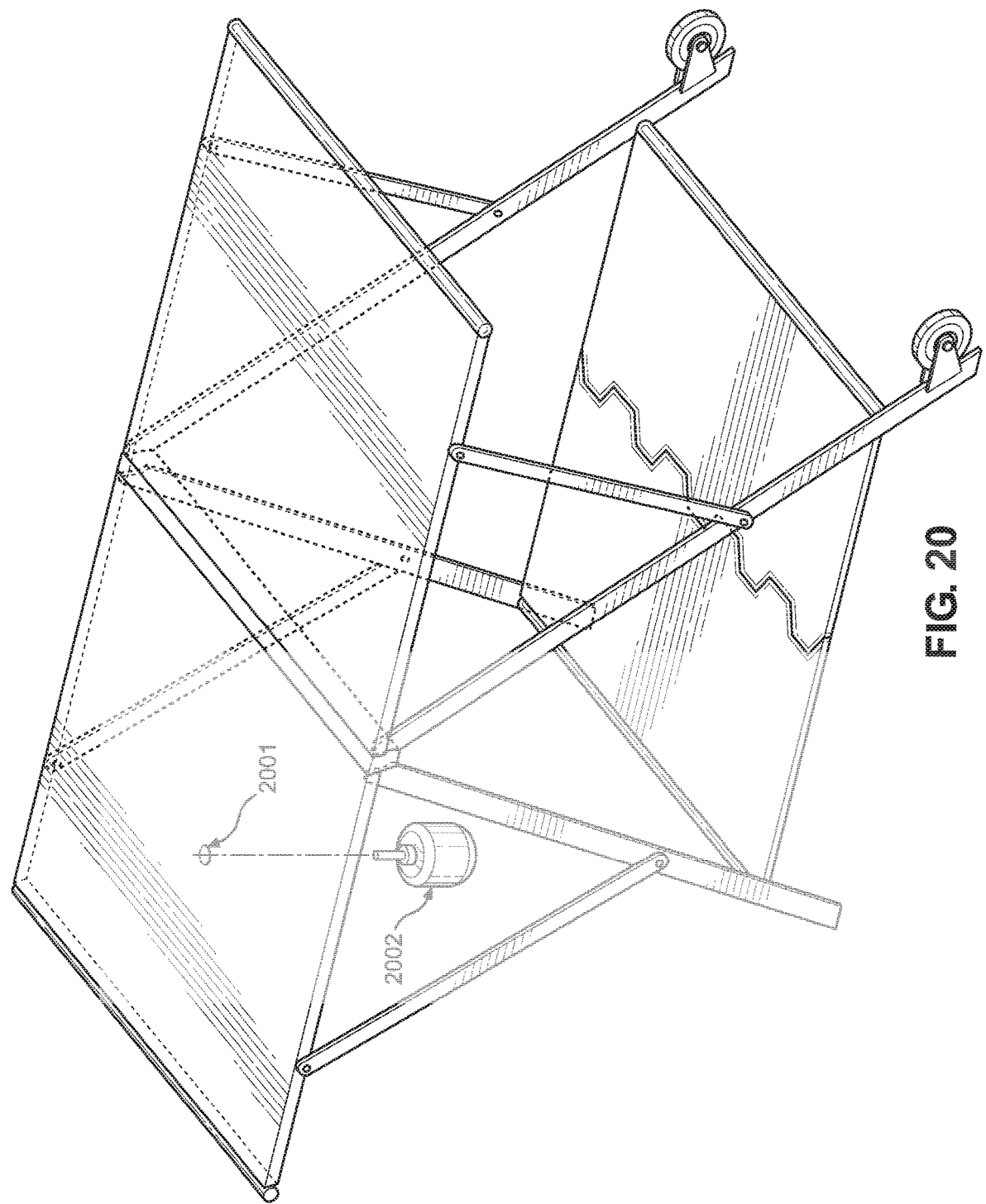
FIG. 20 shows a perspective view of an embodiment of the apparatus having a router placed therein.

Referring now to FIG. 20, there is shown a perspective view of an embodiment of the apparatus having a router placed therein. In one embodiment an apparatus top section has an aperture 2001 located therethrough. In this embodiment the aperture is configured to accept a router 2002 therein. The router is connected to the underside of the apparatus top section. This will hold the router 2002 in place for use. The apparatus top section will allow wood or other items to be slid into the router and cut.

Figure 21:
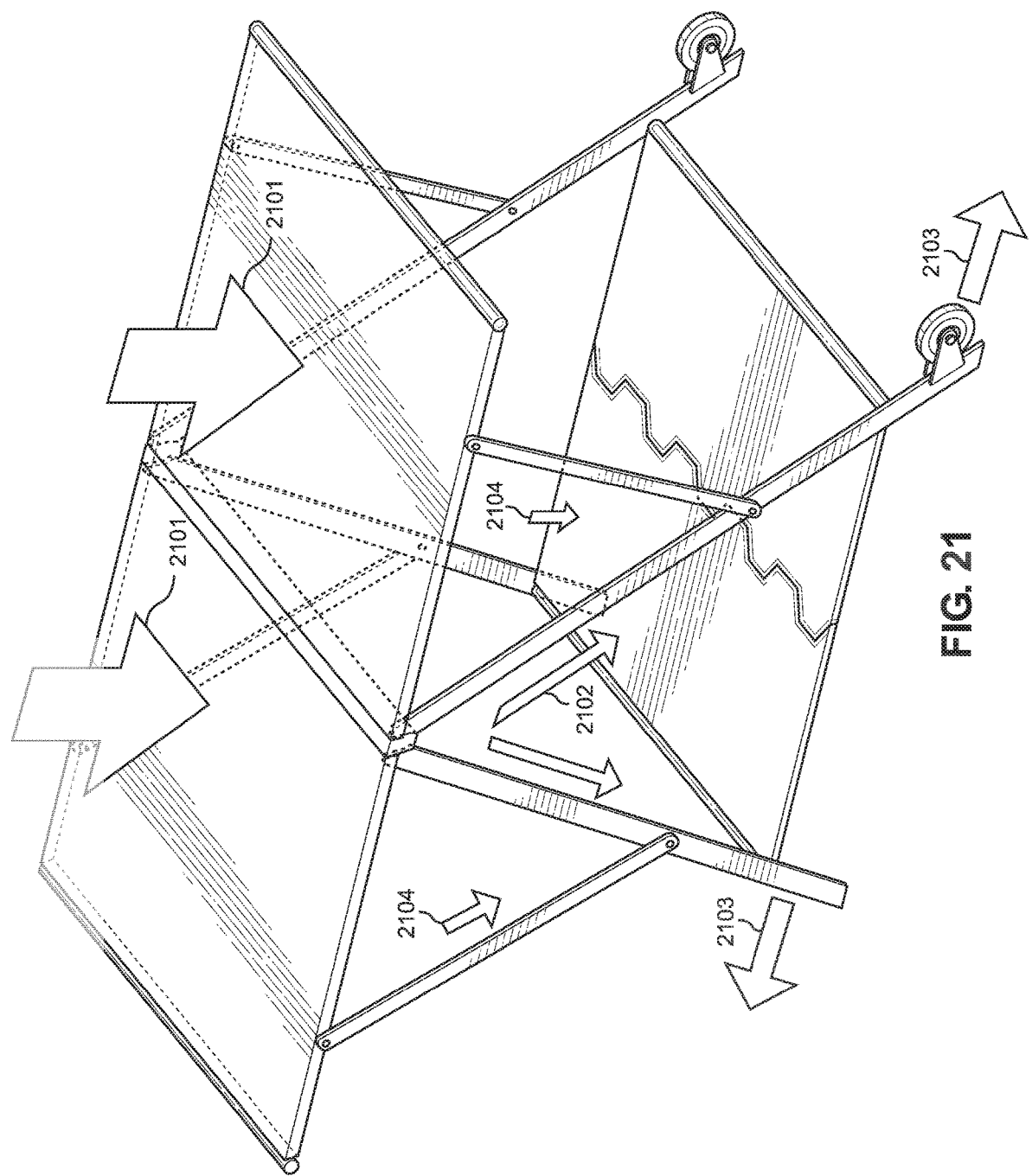
FIG. 21 shows a perspective view of an embodiment of the apparatus with arrows to represent force applied to the apparatus.

Referring now to FIG. 21, there is shown a perspective view of an embodiment of the apparatus with arrows to represent force applied to the apparatus. In the shown figure there are forces shown as acted upon the apparatus when a load is placed upon the apparatus top sections. The down force 2101 shows a downward force or the load applied to the apparatus top. The down force 2101 will enact a leg force 2102 down each leg. The leg force 2102 will push the legs in an outward direction 2103. The load force 2101 will also place a load on the supports 2104. The outward force 2103 will apply a force counter to the support force 2104. This will allow the apparatus to become stronger when a load is placed thereon.

Figure 22:
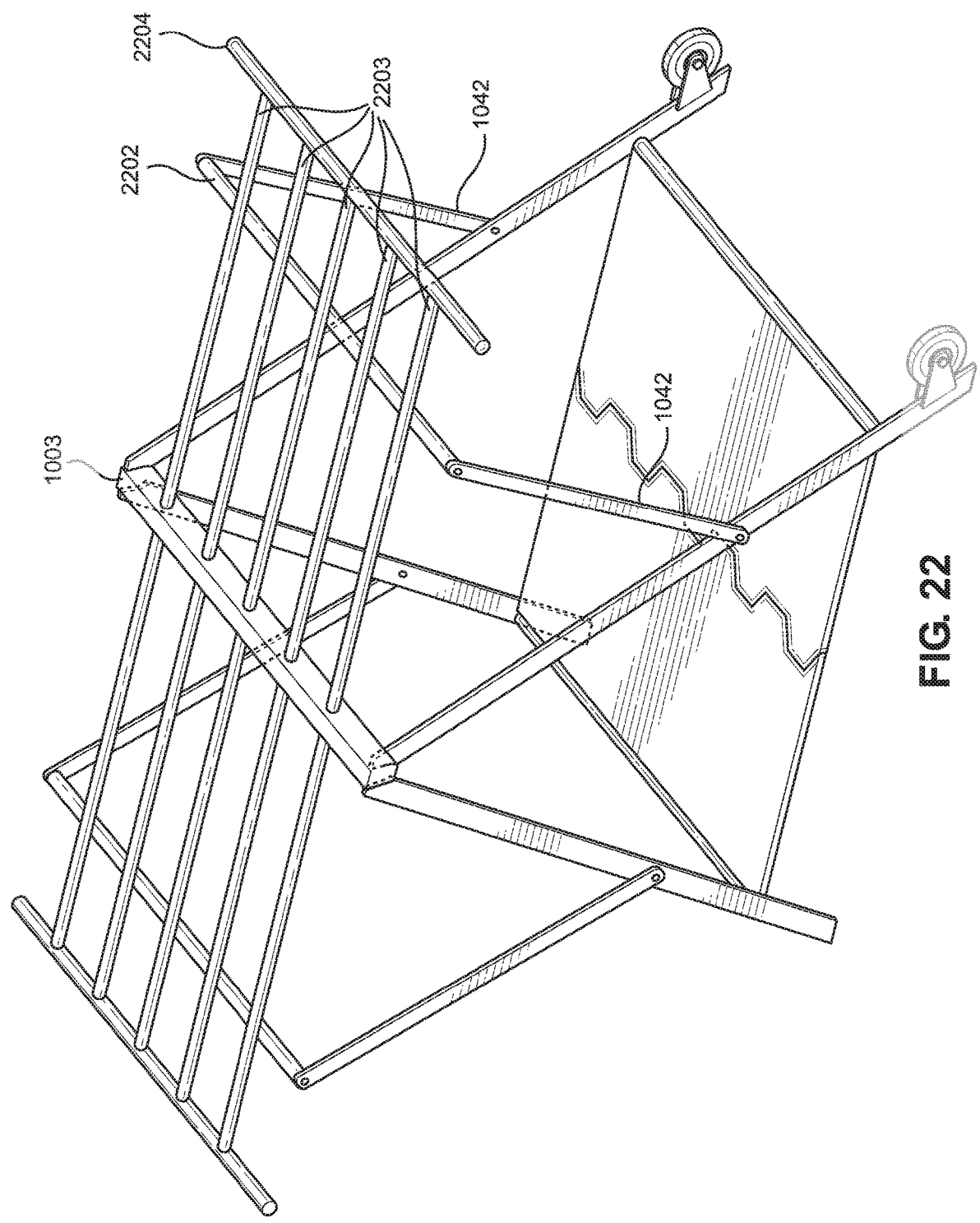
FIG. 22 shows a perspective view of an embodiment of the apparatus having a clothes drying apparatus top.

Referring now to FIG. 22, there is shown a perspective view of an embodiment of the apparatus having a clothes drying apparatus top. In one embodiment the apparatus top is made from a plurality of bars 2203. The bars 2203 are hingedly attached to the center support structure 1003. In one embodiment the bars are further supported by a cross bar 2202. The cross bar 2202 is hingedly attached to the support bars 1042. In one embodiment there is further an outer support bar 2204. The outer support bar will prevent the plurality of bars from bending together.

Those of ordinary skill in the art will conceive of other alternate embodiments of the invention upon reviewing this disclosure. Thus, the invention is not to be limited to the above description but is to be determined in scope by the claims which follow.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An A-frame foldable apparatus, comprising:
a first apparatus top section and a second apparatus top section movably attached to a center support structure;
a first set of legs movably attached to the center support structure and a second set of legs pivotally attached to the center support structure;
wherein each set of legs comprises a first and a second leg support extending from the legs to the apparatus top sections;
wherein a shelf connection is placed between the first and second leg support;
wherein a shelf is movably attached to each pair of legs, wherein the shelf comprises a first section and second section, wherein the first and second sections are movably attached to each other at opposite ends of the shelf connection holding the legs in a fixed position;
wherein the second apparatus top section is split into an upper apparatus top section and a lower apparatus top section.

2. The A-frame foldable apparatus of claim 1, wherein:
the upper apparatus top section is movably attached to the center support structure;
the lower apparatus top section is movably attached at one end to the second set of legs;
wherein the lower apparatus top section has a set of leg supports attached to the end opposite a movable attachment, wherein the set of leg supports attaches to the lower part and the second set of legs.

3. The A-frame foldable apparatus of claim 2, wherein the lower apparatus top section is positioned to receive an apparatus saw thereon.

4. The A-frame foldable apparatus of claim 1, further comprising a plurality of apertures located through the first apparatus top section and the second apparatus top section.

5. The A-frame foldable apparatus of claim 4, further comprising a series of plugs removably placed within at least one aperture.

6. The A-frame foldable apparatus of claim 1, further comprising a single aperture placed in the second apparatus top section.

7. The A-frame foldable apparatus of claim 6, further comprising a sink configured to be placed within the single aperture.

8. The A-frame foldable apparatus of claim 6, further comprising a tub configured to be placed within the single aperture.

9. The A-frame foldable apparatus of claim 1, further comprising a router hole opening placed within the second apparatus top section.

10. The A-frame foldable apparatus of claim 9, further comprising a router connected to the underside of the second apparatus top section, wherein the router blade sticks upward through the router hole opening.

11. The A-frame foldable apparatus of claim 1, wherein:
the lower apparatus top section further comprises a first support structure having a pair of side supports and an end support;
a pair of cross supports located perpendicularly across the pair of side supports;
the upper apparatus top section and the lower apparatus top section are attached to the pair of cross supports.

12. The A-frame foldable apparatus of claim 11, further comprising:
a screw located within each one of the pair of cross supports, wherein the screw is operated by a crank located on one end of each of the pair of cross supports;
the upper apparatus top section and the lower apparatus top section movably attached to the screws.

13. The A-frame foldable apparatus of claim 1, wherein the first apparatus top section and the second apparatus top section are comprised of a plurality of rods, wherein the rods are spaced apart.

14. An A-frame foldable apparatus, comprising:
a first apparatus top section and a second apparatus top section movably attached to a center support structure;
a first set of legs movably attached to the center support structure and a second set of legs pivotally attached to the center support structure;
wherein each set of legs comprises a first leg support and a second leg support extending from the legs to the apparatus top sections;
the first set of legs, the second set of legs, the first apparatus top section, the second apparatus top section, the first leg support and the second leg support creating a truss structure;
wherein the second apparatus top section is split into an upper apparatus top section and a lower apparatus top section.

15. The A-frame foldable apparatus of claim 14, wherein the truss structure allows the apparatus to become stronger when a load is applied to an apparatus top.

16. The A-frame foldable apparatus of claim 14, further comprising a shelf connection is placed between the first and second leg support;
wherein a shelf is movably attached to each pair of legs, wherein the shelf comprises a first section and second section, wherein the first and second sections are movably attached to each other at opposite ends of the shelf connection holding the legs in a fixed position.

17. The A-frame foldable apparatus of claim 16, wherein the shelf applies tension to the legs increasing the load capacity.

18. The A-frame foldable apparatus of claim 14, wherein the supports counteract the outward pressure of the legs when a load is applied.

19. The A-frame foldable apparatus of claim 18, wherein pressure is applied to the ground through the legs and supports keeping the apparatus tops in an upward position.

* * * * *